United States Patent
Vibhor et al.

(10) Patent No.: US 9,798,596 B2
(45) Date of Patent: Oct. 24, 2017

(54) AUTOMATIC ALERT ESCALATION FOR AN INFORMATION MANAGEMENT SYSTEM

(71) Applicant: CommVault Systems, Inc., Oceanport, NJ (US)

(72) Inventors: Anand Vibhor, Manalapan, NJ (US); Rajiv Kottomtharayil, Marlboro, NJ (US); Amey Vijaykumar Karandikar, Long Branch, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 73 days.

(21) Appl. No.: 14/274,439

(22) Filed: May 9, 2014

(65) Prior Publication Data
US 2015/0242264 A1 Aug. 27, 2015

Related U.S. Application Data

(60) Provisional application No. 61/945,587, filed on Feb. 27, 2014.

(51) Int. Cl.
  *G06F 11/00* (2006.01)
  *G06F 11/07* (2006.01)
  (Continued)

(52) U.S. Cl.
  CPC ........ *G06F 11/0709* (2013.01); *G06F 9/4881* (2013.01); *G06F 11/0772* (2013.01);
  (Continued)

(58) Field of Classification Search
  USPC .............................................. 714/57, 48, 54
  See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

"2003 Gold: CommVault QiNetix 4.2," SearchStorage.com, downloaded from: searchstorage.techtarget.com/news/article/0,289142,sid5 gci942854,00.html, Dec. 30, 2003, pp. 1-3.

(Continued)

*Primary Examiner* — Kamini Patel
(74) *Attorney, Agent, or Firm* — Perkins Coie LLP

(57) ABSTRACT

Disclosed herein are systems and methods for managing information management operations. The system may be configured to employ a work flow queue to reduce network traffic and manage server processing resources. The system may also be configured to forecast or estimate information management operations based on estimations of throughput between computing devices scheduled to execute one or more jobs. The system may also be configured to escalate or automatically reassign notification of system alerts based on the availability of system alert recipients. Various other embodiments are also disclosed herein.

15 Claims, 15 Drawing Sheets

(51) Int. Cl.
*G06F 9/48* (2006.01)
*H04L 29/08* (2006.01)
*G06Q 10/00* (2012.01)
*G06Q 10/06* (2012.01)
*G06Q 10/10* (2012.01)

(52) U.S. Cl.
CPC ......... *G06F 11/0784* (2013.01); *G06Q 10/00* (2013.01); *G06Q 10/06* (2013.01); *G06Q 10/10* (2013.01); *H04L 67/10* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,678,042 A | 10/1997 | Pisello et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,625,747 B1 | 9/2003 | Tawil et al. |
| 6,658,436 B2 | 12/2003 | Oshinsky et al. |
| 6,658,526 B2 | 12/2003 | Nguyen et al. |
| 6,771,595 B1 | 8/2004 | Gilbert et al. |
| 6,820,035 B1 | 11/2004 | Zahavi |
| 7,007,042 B2 | 2/2006 | Lubbers et al. |
| 7,035,880 B1 | 4/2006 | Crescenti et al. |
| 7,039,827 B2 | 5/2006 | Meyer et al. |
| 7,082,441 B1 | 7/2006 | Zahavi et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,740 B1 | 9/2006 | Colgrove et al. |
| 7,130,970 B2 | 10/2006 | Devassy et al. |
| 7,146,377 B2 | 12/2006 | Nowicki et al. |
| 7,171,459 B2 | 1/2007 | Sanghvi et al. |
| 7,197,490 B1 | 3/2007 | English |
| 7,203,944 B1 | 4/2007 | van Rietschote et al. |
| 7,213,040 B1 | 5/2007 | Stokes et al. |
| 7,216,244 B2 | 5/2007 | Amano |
| 7,225,356 B2 | 5/2007 | Monitzer |
| 7,275,103 B1 | 9/2007 | Thrasher et al. |
| 7,287,063 B2 | 10/2007 | Baldwin et al. |
| 7,328,260 B1 | 2/2008 | Muthiyan et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,373,415 B1* | 5/2008 | DeShan ............. H04L 12/2697 709/231 |
| 7,395,282 B1 | 7/2008 | Crescenti et al. |
| 7,401,338 B1 | 7/2008 | Bowen et al. |
| 7,403,987 B1 | 7/2008 | Marinelli et al. |
| 7,454,569 B2 | 11/2008 | Kavuri et al. |
| 7,493,300 B2 | 2/2009 | Palmer et al. |
| 7,565,661 B2 | 7/2009 | Sim-Tang |
| 7,644,245 B2 | 1/2010 | Prahlad et al. |
| 7,685,128 B2 | 3/2010 | Anderson et al. |
| 7,765,167 B2 | 7/2010 | Prahlad et al. |
| 7,917,695 B2 | 3/2011 | Ulrich et al. |
| 7,934,071 B2 | 4/2011 | Abe et al. |
| 7,945,810 B2 | 5/2011 | Soran et al. |
| 8,060,587 B2 | 11/2011 | Ahmad et al. |
| 8,086,907 B1* | 12/2011 | Narin ................. H04L 41/0604 709/224 |
| 8,112,605 B2 | 2/2012 | Kavuri |
| 8,195,800 B2 | 6/2012 | Tameshige et al. |
| 8,266,406 B2 | 9/2012 | Kavuri |
| 8,306,926 B2 | 11/2012 | Prahlad et al. |
| 2003/0065759 A1 | 4/2003 | Britt et al. |
| 2005/0091369 A1 | 4/2005 | Jones |
| 2006/0106641 A1* | 5/2006 | Bartsch ................. G06F 19/327 705/2 |
| 2007/0088572 A1* | 4/2007 | Susai ..................... G06Q 10/06 705/2 |
| 2007/0297418 A1* | 12/2007 | Lee .......................... H04L 63/00 370/395.52 |
| 2008/0120688 A1* | 5/2008 | Qiu ........................ G06F 21/552 726/1 |
| 2008/0189162 A1* | 8/2008 | Ganong ............... G06F 17/3089 705/7.13 |
| 2010/0011256 A1* | 1/2010 | Nakajima ............ G06F 11/2025 714/48 |

(56) References Cited

U.S. PATENT DOCUMENTS

| | | | | |
|---|---|---|---|---|
| 2010/0186020 A1* | 7/2010 | Maddhirala | ............ | G06F 9/5038 718/105 |
| 2010/0257412 A1* | 10/2010 | Acuna | ................. | G06F 11/0727 714/54 |
| 2013/0042256 A1* | 2/2013 | Qian | ..................... | G06F 11/079 719/318 |
| 2015/0244775 A1* | 8/2015 | Vibhor | .................. | G06F 11/079 709/203 |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

"CommVault QiNetix: Dynamic Data Management," Product brochure downloaded from: www.stephord.com/book%5CQiNetix_Brochure.pdf, CommVault Systems, Inc., © 2003, pp. 1-6.

"CommVault QiNetix: Galaxy Backup and Recovery—Data Protection," Product brochure downloaded from: www.hitachidatasystems.com/assets/pdf/ProductTriF old_Galaxy .pdf, Comm Vault Systems, Inc., © 2002, pp. 1-5.

"CommVault QiNetix: Galaxy iDataAgent for SharePoint Portal Server," Product brochure downloaded from: directory .partners.extranet.microsoft.com/collaterai/2123/DS_GBR_MSFTSPPServer .pdf, CommVault Systems, Inc., © 2002, pp. 1-2.

Agrawal, Dakshi, et al., "Policy-Based Validation of SAN Configuration", Policy '04, Jun. 7-9, 2004, pp. 77-86.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Beck, Micah, et al., "The Internet2 Distributed Storage Infrastructure Project: An Architecture for Internet Content Channels", Computer Networks and ISDN Systems, vol. 30, Issues 22-23, Nov. 1998, pp. 2141-2148.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Charlu, Daniel, "HP Hyperplex Clustering Technology", Proc. of the 1st IEEE Computer Science Workshop on Cluster Computing, Melbourne, Australia, Dec. 2-3, 1999, pp. 347-356.

Eitel, "Backup and Storage Management in Distributed Heterogeneous Environments," *IEEE*, Jun. 12-16, 1994, pp. 124-126.

Gait, J., "The Optical File Cabinet: A Random-Access File System for Write-Once Optical Disks," *IEEE Computer,* vol. 21, No. 6, pp. 11-22 (Jun. 1988).

Hirao, Tetsuhiro, et al., "Resource Management", Fujitsu Tech. J., vol. 40, No. 1, Jun. 2004, pp. 123-132.

Jander, M., "Launching Storage-Area Net," *Data Communications,* US, McGraw Hill, NY, vol. 27, No. 4 (Mar. 21, 1998), pp. 64-72.

Kaczmarski, M., et al., "Beyond Backup Toward Storage Management", IBM Systems Journal, vol. 42, No. 2, Apr. 2003, pp. 322-337.

Menon, Jai, et al., "IBM Storage Tank—A Heterogeneous Scalable SAN File System", IBM Systems Journal, vol. 42 No. 2, © 2003, pp. 250-267.

Rosenblum et al., "The Design and Implementation of a Log-Structured File System," *Operating Systems Review SIGOPS,* vol. 25, No. 5, New York, US, pp. 1-15 (May 1991).

Schultz, Nick, "QiNetix from CommVault", Computer Technology Review, Oct. 1, 2002, one page.

Supplementary European Search Report for PCT/US2005/015202, mailing date Mar. 16, 2010, 3 pages.

U.S. Appl. No. 14/274,405, filed May 9, 2014, titled Work Flow Management for an Information Management System.

U.S. Appl. No. 14/293,546, filed Jun. 2, 2014, titled Dataflow Alert for an Information Management System.

\* cited by examiner

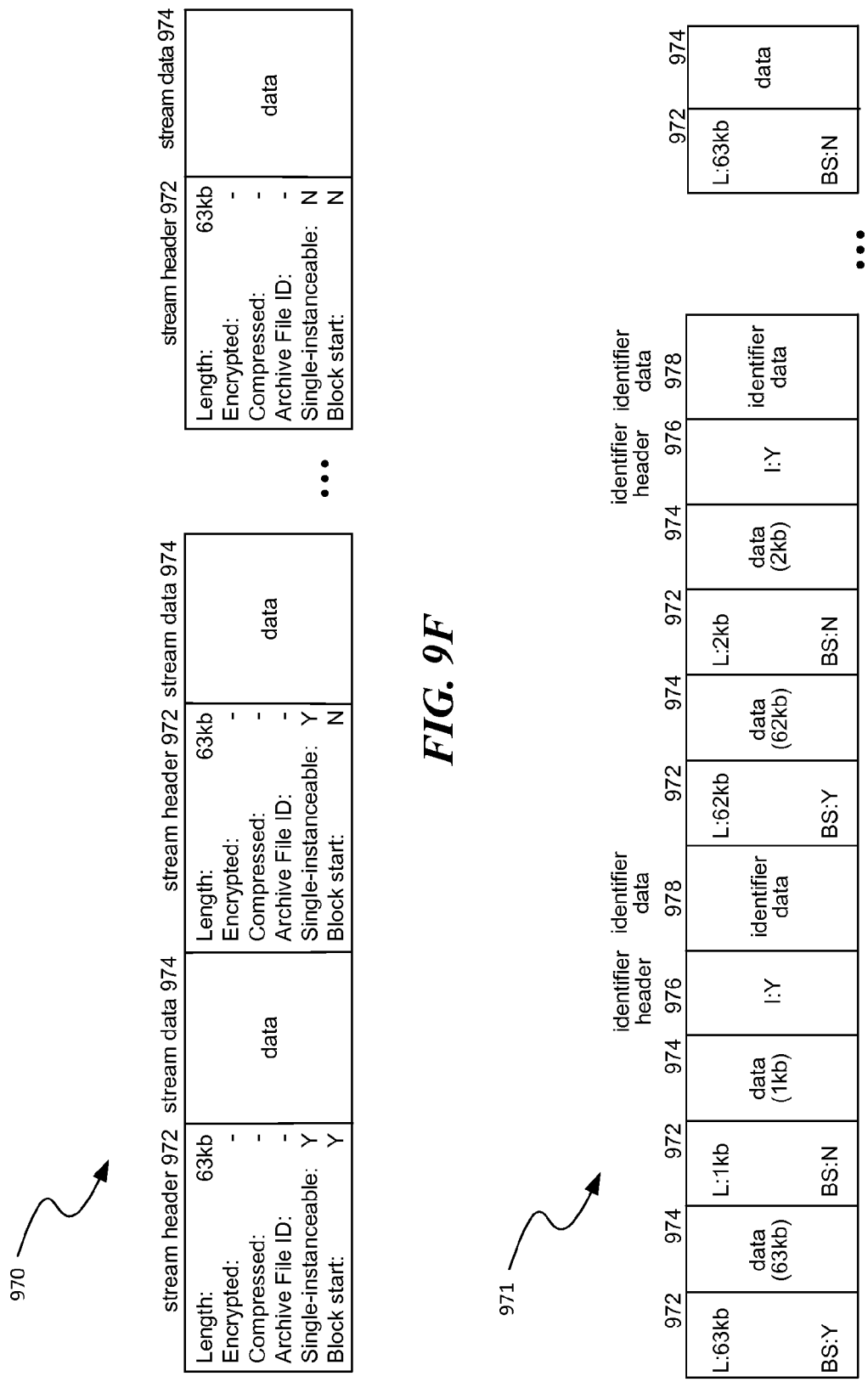

AUTOMATIC ALERT ESCALATION FOR AN INFORMATION MANAGEMENT SYSTEM

CROSS-REFERENCE TO RELATED APPLICATION(S)

The present application claims priority to and the benefit of U.S. Provisional Application No. 61/945,587, filed Feb. 27, 2014, which is hereby incorporated herein by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

BRIEF DESCRIPTION OF THE DRAWINGS

The following figures illustrate aspects of the disclosed invention.

FIGS. 9F-9H are block diagrams illustrating suitable data structures that may be employed by the information management system.

DETAILED DESCRIPTION

Overview

Figure 1:
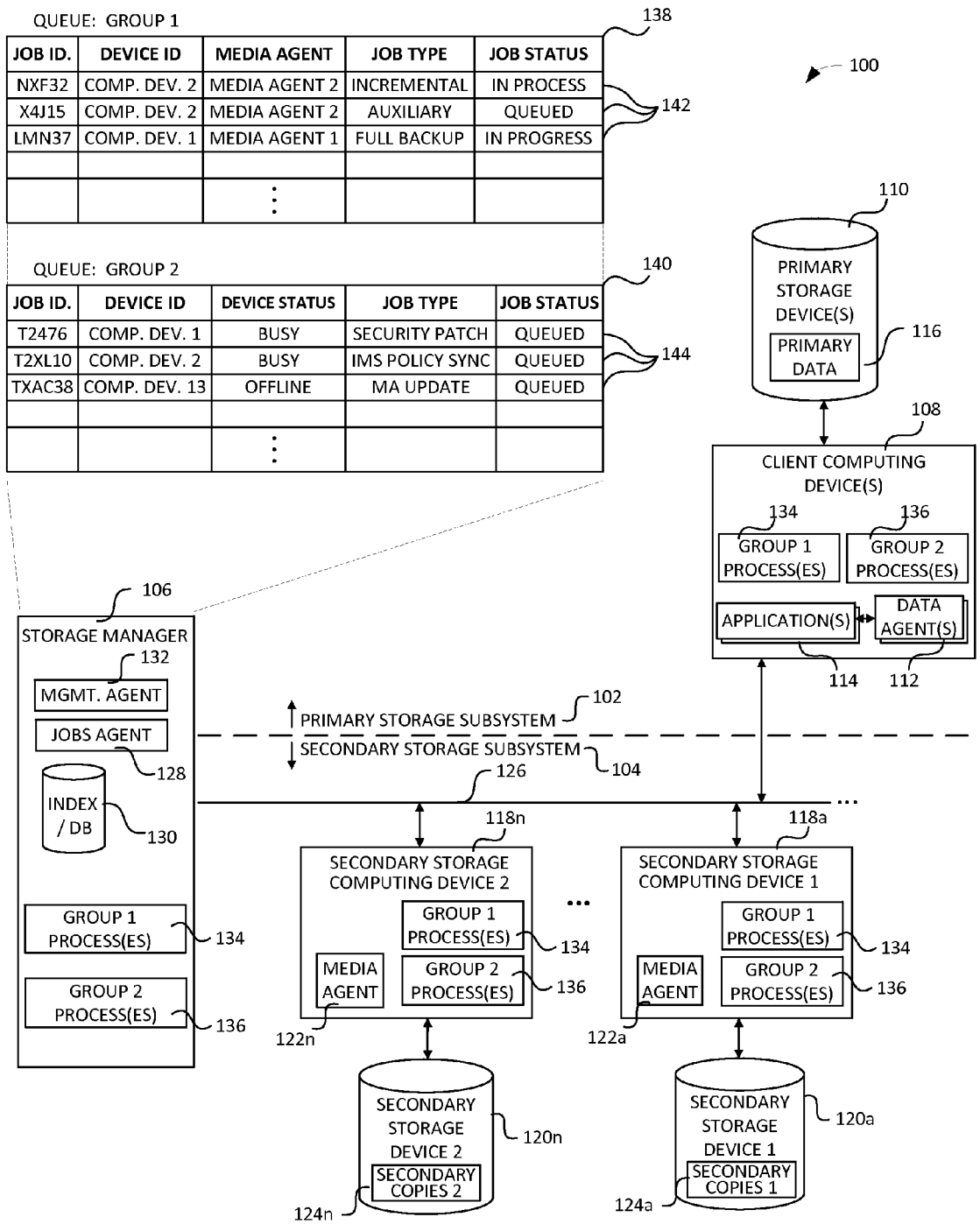
FIG. 1 is a block diagram illustrating a work flow queue in an information management system.

With the increasing importance of protecting and leveraging data, organizations simply cannot afford to take the risk of losing critical data. Moreover, runaway data growth and other modern realities make protecting and managing data an increasingly difficult task. Therefore, there is a need for efficient, powerful, and user-friendly solutions for protecting and managing data.

Depending on the size of the organization, there are typically several data production sources under the purview of tens, hundreds, or even thousands of employees or other individuals. It is now common for nearly each of the numerous employees, students, or other individuals to use or be assigned a computing device ("client") for accomplishing daily tasks. Organizations then deploy servers in a variety of hierarchical configurations to provide information management and other services to the clients.

To increase the productivity of computing devices, such as servers in an information management system, a storage manager can be configured to manage server jobs that are not defined by a data storage policy or a data retention policy. Some embodiments of the present disclosure provide methods capable of managing servers by queuing and issuing non-storage policy and non-retention policy jobs to servers, based on server statuses, e.g., available and/or idle (although the methods can apply to any computing device). By configuring the storage manager to queue and issue jobs the servers, e.g., using push queue techniques, query traffic from the servers to the storage manager can be reduced. The reduction of server-originating requests can reduce the load on the server manager, increase the availability of network bandwidth, and allow server processing resources to be dedicated to processing jobs that are already assigned to the servers.

In addition to managing, e.g., queuing and issuing jobs, a storage manager may notify a system administrator, or other users, of jobs that appear as though they will not complete within a prescribed time limit. Some embodiments of the present disclosure describe systems and methods of forecasting or estimating failures of jobs to complete in a timely manner, e.g., based on throughput estimations between a transmitting computing device and a receiving computing device. Thus, rather than comparing the number of jobs or amount of data being copied to a threshold to determine a possible failure, the system compares data throughput (amount of data processed per time unit) to a threshold. The storage manager can be configured to generate an alert for notifying a user of the forecasted failure. In response to the alert, the user can remedy the source of the issue causing the alert, or the user can reschedule around the problematic job.

By receiving an alert and taking remedial action, a user may be able to prevent network congestion, which may impact other users of the network.

Even if the storage manager generates or transmits a system alert to a user, the user may be unavailable to respond to the alert or unable to address an otherwise preventable job failure and/or network congestion. Some embodiments of the present disclosure describe systems and methods of escalating alerts when such an alert recipient is unavailable. The availability of an alert recipient can be determined by using system directory tools or can be based on failure to acknowledge the alert. Escalating an alert can include transmitting the alert to other members or to supervisors of an information technology ("IT") team or information management administration team. By escalating alerts, a storage manager can reduce the risk of system failures going unanswered and can therefore reduce an organization's risk of having an unprotected information system or unprotected computing devices. For example, the storage manager may be configured to escalate alerts if a storage device or storage computing device unexpectedly goes offline; if network bandwidth drops below a predetermined threshold; or if a scheduled job is forecasted to fail to complete within a prescribed time limit.

Brief Information Management System Overview

FIG. 1 illustrates work queue management in an information management system 100, according to one embodiment. The information management system 100 includes a variety of different computing devices. For instance, as will be described in greater detail herein, the information management system 100 may include a primary storage subsystem 102, a secondary storage subsystem 104, and a storage manager 106. Together, these components and systems enable users to create, store, and otherwise manage data objects associated with the user.

The primary storage subsystem 102 includes one or more client computing devices 108 communicatively coupled to one or more primary storage devices 110. The client computing device 108 can include any number of electronic computing devices, such as a desktop, laptop, tablet, smart phone, wearable device, vehicle-mounted device or the like.

As illustrated, the client computing device 108 may include one or more data agents 112 that are configured to manage information generated by or through the use of one or more applications 114 installed on the client computing device 108. The data agent 112 communicates with the primary storage device 110, the storage manager 106, and components within the secondary storage system 104 to facilitate the manipulation of and retention of primary data 116 that is located on the primary storage device 110.

Primary data 116, according to some embodiments, is production data or other "live" data generated by the operating system and other applications 114 residing on a client computing device 108. The primary data 116 is generally stored on the primary storage device(s) 110 and is organized via a file system supported by the client computing device 108. For instance, the client computing device(s) 108 and corresponding applications 114 may create, access, modify, write, delete, and otherwise use primary data 116. In some cases, some or all of the primary data 116 can be stored in cloud storage resources.

Primary data 116 is generally in the native format of the source application 114. According to certain aspects, primary data 116 is an initial or first stored copy of data generated by the source application 114 (e.g., created before any other copies or before at least one other copy). Primary data 116 in some cases is created substantially directly from data generated by the corresponding source applications 114.

The primary data 116 may sometimes be referred to as a "primary copy" in the sense that it is a discrete set of data. However, the use of this term does not necessarily imply that the "primary copy" is a copy in the sense that it was copied or otherwise derived from another stored version The primary storage device 110 can serve the storage needs of the client computing device 108 in any one of a number of storage device implementations. For example, the primary storage device 110 can be a mechanical or solid-state hard drive, a network accessible storage device ("NAS"), or the like.

While the primary storage system 102 depicts a single client computing device 108 and a single primary storage device 110, the primary storage subsystem 102 can include tens, hundreds, or thousands of client computing devices 108 and primary storage devices 110. The primary storage subsystem 102 can represent some or all of the computing devices used to support productivity of a business, educational institution, or other organization valuing the protection, retention, and maintenance of electronically generated information.

Additional details regarding various exemplary embodiments of the components of the primary storage subsystem 102 are provided below in the discussion associated with FIGS. 9A-9H.

For recovery and/or regulatory compliance purposes, it may be useful to generate copies of the primary data 116. Accordingly, the secondary storage subsystem 104 includes one or more secondary storage computing devices 118 and one or more secondary storage devices 120 configured to create and store one or more secondary copies 124 (inclusive of copies 124a-124n) of the primary data 116 and associated metadata.

Creation of secondary copies 124 can help in search and analysis efforts and meet other information management goals, such as: restoring data and/or metadata if an original version (e.g., of primary data 116) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 108 access or receive primary data 116 and communicate the data, e.g., over the communication pathways 126, for storage in the secondary storage device(s) 120. The communication pathways 126 can include one or more private and/or public networks, including local area networks, wide area networks, campus area networks, metropolitan area networks, and the like.

A secondary copy 124 can comprise a separate stored copy of application data that is derived from one or more earlier-created, stored copies (e.g., derived from primary data 116 or another secondary copy 124). Secondary copies 124 can include point-in-time data, and may be intended for relatively long-term retention (e.g., weeks, months or years), before some or all of the data is moved to other storage or is discarded. Types of secondary copies can include full backup, incremental backup, auxiliary copy, etc.

The secondary storage computing devices 118 provide intermediary interface between the secondary storage devices 120 and other components of the information management system 100. Each secondary storage computing device 118 may be associated with or may include a media agent 122 to facilitate inter-component communications within the information management system 100. The media agent 122 configured to communicate with the storage manager 106 and with the data agent 112 of the client computing device 108. The media agent 122 also interfaces with the secondary storage devices 124 to copy, read, analyze, transfer or otherwise manipulate secondary copies 124.

Additional details regarding various exemplary embodiments of the components of the secondary storage subsystem 104 are provided below in the discussion associated with FIGS. 9A-9H.

The storage manager 106 is centralized storage and/or information manager that is configured to perform certain control functions. The storage manager 106 is communicatively coupled between the primary storage subsystem 102 and the secondary storage subsystem 104 via the communication channel(s) 126. The storage manager 106 facilitates transfer of data between the primary storage subsystem 102 and the secondary storage subsystem 104. For example, the storage manager 106 may instruct the data agent 112 to retrieve some or all of primary data 116. The storage manager 106 may then initiate communications between the data agent 112 and one or more media agents 122 to transfer some or all of the primary data 116 to one or more of the secondary storage devices 120. According to some embodiments, the storage manager 106 may employ a software module, such as a jobs agent 128, to initiate, facilitate, schedule, and otherwise manage communications between the data agent 112 and the media agents 122.

The storage manager 106 can be configured to support additional information management operations. For example, the storage manager 106 may include an index 130 or may interface with the index 130. The index 130 can be a database or other data structure that can be used to track and/or schedule information management policies, e.g., storage policies and retention policies. For example, each time the storage manager 106 executes a transfer of information from the primary storage subsystem 102 to the secondary storage subsystem 104, the storage manager 106 can update the index 130 to reflect the operation. The storage manager 106 can be configured to update the index 130 to reflect all information management operations that have occurred or that are scheduled to be executed in the information management system 100. For example, in accordance with a data retention policy, the jobs agent 128 may reference the index 130 prior to transferring a secondary copy 124 from one secondary storage computing device 120 to another slower and less costly secondary storage device 120.

The information management system 100 may constitute a single information management systems cell of multiple information management system cells operated by a particular business, educational institution, or other organization. The storage manager 106 may include and utilize a management agent 132 to communicate with other similar storage managers of other information management system cells. When needed or requested, the storage manager 106 can acquire or query other storage managers or other information management system cells for information satisfying the criteria of the queries. Upon receipt of information requested from other information management system cells, the storage manager 106 may update one or more databases, tables, data structures, or the like, e.g., the index 130.

While distributing functionality amongst multiple computing devices can have certain advantages, in other contexts it can be beneficial to consolidate functionality on the same computing device. As such, in various other embodiments, one or more of the components shown in FIG. 1 as being implemented on separate computing devices are implemented on the same computing device. In one configuration, a storage manager 106, one or more data agents 112, and one or more media agents 122 are all implemented on the same computing device. In another embodiment, one or more data agents 112 and one or more media agents 122 are implemented on the same computing device, while the storage manager 106 is implemented on a separate computing device.

Work Queues

The storage manager 106 can be configured to manage various jobs types within the information management system 100 using different resources. For example, the storage manager 106 can categorize all jobs or tasks to be performed in the information management system 100 into one or more groups, types, or categories. Then, the storage manager can allocate particular types of jobs to particular storage manager resources, such as processes. For example, the storage manager can allocate a first group of processes 134 to jobs for executing a data storage and/or data retention policy, and can allocate a second group of processes 136 to jobs for executing other jobs related to the information management system 100. Jobs associated with the first group processes 134 can include tasks such as analyzing data, backing up data, restoring data, retaining data, and the like. Jobs associated with the second group of processes 136 can include jobs associated with maintenance of the information management system 100 (e.g., releases of software updates), security maintenance (e.g., security patches, virus scans, etc.), and information management system policy synchronizations (e.g., changes to job preemption policies, changes to job priorities, updates to alert definitions, etc.). The jobs associated with the first group of processes 134, e.g., those used for executing the storage/retention policy, may be impractical to manage from components other than the storage manager 106 within the information management system 100. Therefore, these jobs can be managed and issued by the storage manager 106, in accordance with data storage and data retention policies, stored and maintained by the storage manager 106. The first group of processes 134 can be interchangeably referred to as information management operation or system processes 134, and the second group of processes 136 (although different from the first group of processes 134) can be interchangeably referred to as information management system or operation processes 136.

By contrast, the jobs or tasks associated with the second group of processes 136 may traditionally be initiated from and managed by servers or client devices, other than the storage manager 106, within the information management system 100. Such an implementation of task management can have several disadvantages. In the case where the storage manager 106 manages tens, hundreds, or thousands of client computing devices 108 and secondary storage computing devices 118, receiving requests for updates or task authorization from all of these devices in an unscheduled manner can result in a bombardment of the storage manager 106. Additionally, when the client computing devices 108 and/or the secondary storage computing devices 118 dedicate processing resources, e.g. CPU cycles and memory, to request approval or information for jobs from the storage manager 106, then these resources are at least partially unavailable to perform backup, restoration, and retention operations. Additionally, each request consumes bandwidth on the communication pathways 126 that communicatively couple the components of the information management system 100.

Configuring the storage manager 106 to manage and issue jobs associated with the second group of processes 136 can take advantage of the storage manager 106 holistic awareness of the statuses of the computing device within the primary storage subsystem 102 and the secondary storage subsystem 104. For example, since the storage manager 106 already uses the jobs agent 128 for tracking the status of various jobs within the primary storage subsystem 102 and the secondary storage subsystem 104, the storage manager 106 is positioned to efficiently issue non-storage/retention policy jobs to the computing devices of the primary storage subsystem 102 and secondary storage subsystem 104 based on the operational statuses of the computing devices. For example, the storage manager 106 may be configured to issue a management system update job to a secondary storage computing device 118 if the secondary storage computing device is online, available, and is not presently scheduled to execute a job within a data storage or retention policy.

The storage manager 106 may use various work queues to manage (e.g., track and schedule) jobs in the information management system 100. For example, the storage manager 106 may manage the first group of processes 134 using a first work queue 138. The storage manager 106 may manage the second group of processes 136 using a second work queue 140.

The first work queue 138 may be any form of data structure, such as a table, that includes a number of columns identifying aspects of a job, such as the job ID, the device ID, a media agent identifier, the type of job, and the job status, etc. Although not shown, the first work queue 138 can also include additional columns, such as a data agent identification, errors, and a numerical indication of job progression. The first work queue 138 may also include a number of rows 142, each associated with a single job or task.

The second work queue 140 may only include jobs that are associated with the second group of processes 136. The second work queue 140 may include columns such as job ID, device ID, device status, job type, and job status. The second work queue 140 may be organized into one or more rows of tasks 144. As described above, the second group of processes 136 may include jobs or tasks that are associated with the information management system 100 but that are not directly related to backing up data, restoring data, and/or retaining data. In other words, the second group of processes 136 can be associated with jobs that do not accomplish execution of data storage/retention policies, that are unrelated to the data storage/retention policies, or that are only tangentially related to the data storage/retention policies of the information management system. Some of the jobs managed by the second work queue 140 can include, among other things, installation of security patches, synchronization of information management system policies, media agent updates, data agent updates, or other software updates, in accordance with embodiments.

The storage manager 106 may issue jobs to the media agents 122 based on the status of the devices that the media agents 122 control. For example, the storage manager my wait to distribute a job shown in the first of the rows 144 of the second work queue 140, based on a busy status for a computing device, e.g., computing device 1. The storage manager 106 may queue a job or task until a status of the computing device becomes available or idle. In one embodiment, computing device 1 (shown in the second work queue 140) represents the secondary storage computing device 118a or the client computing device 108. For relatively more important jobs scheduled in the second work queue 140, the storage manager 106 may preempt jobs scheduled in the first work queue 138. For example, the storage manager 106 may wait until one, two, or just a few jobs remain scheduled for a particular device in the first work queue 138 before preemptively issuing or prioritizing a job in the second work queue 140 over the job(s) remaining in the first work queue 138 for a particular device.

When computing devices have an offline status, the storage manager 106 suspends unidirectional communications to those devices. The storage manager 106 reduces incoming traffic by unidirectionally issuing and distributing jobs from second work queue 140, e.g., using a push queue mechanism, to media agents 122 and data agents 112. To further reduce network traffic, the storage manager 106 may be configured to suspend issuing jobs when a computing device of a media agent 122 or data agent 112 has an offline status. The storage manager 106 could continuously or periodically ping or transmit messages to an offline computing device to determine when the computing device comes online. However, a more network efficient implementation of the information management system 100 may be to configure some of all of the computing devices to notify the storage manager 106 of a status change from offline to online. At such point, the storage manager 106 can update the second work queue 140 to reflect the current device's status, and may resume distributing jobs from the second work queue 140.

Other devices within the information management system 100 may also be configured to execute some or all of the second group of processes 136, in addition to the first group of processes 134. The first group of processes 134 and the second group of processes 136 may represent portions of information management software that is installed on or executed by the computing devices of the information management system 100. Hence, the first group of processes 134 and the second group of processes 136 are illustrated in FIG. 1 as being included in the client computing device(s) 108 and the secondary storage computing device(s) 118, in addition to the storage manager 106.

By configuring the storage manager 106 to manage jobs that may have been accomplished or managed by the client computing devices 108 or by the secondary storage computing devices 118, the information management system 100 may run more efficiently and with less issue. In particular, the storage manager 106 may protect itself from bombardment by job or task requests, network traffic on the channel 126 may be reduced, and the client computing devices 108 and the secondary storage computing devices 118 may focus their processing resources on executing jobs for the data storage and retention policies. Although the embodiments described above describe a work queue of administrative tasks managed by the storage manager 106, a similar work queue can be executed by one or more secondary storage computing devices 118 to reduce bombardment of these computing devices by subordinate computing devices, e.g., client computing devices 108. In such an embodiment, the client computing devices 108 are configured to wait for the secondary storage computing devices 118 to initiate jobs or tasks, rather than pinging or querying the secondary storage computing devices 118 job request updates. The advantageous result of such a configuration may further reduce network traffic, protect servers from bombardment by requests, and enable the client computing devices 108 to dedicate processing resources to non-managerial jobs or tasks.

Figure 2:
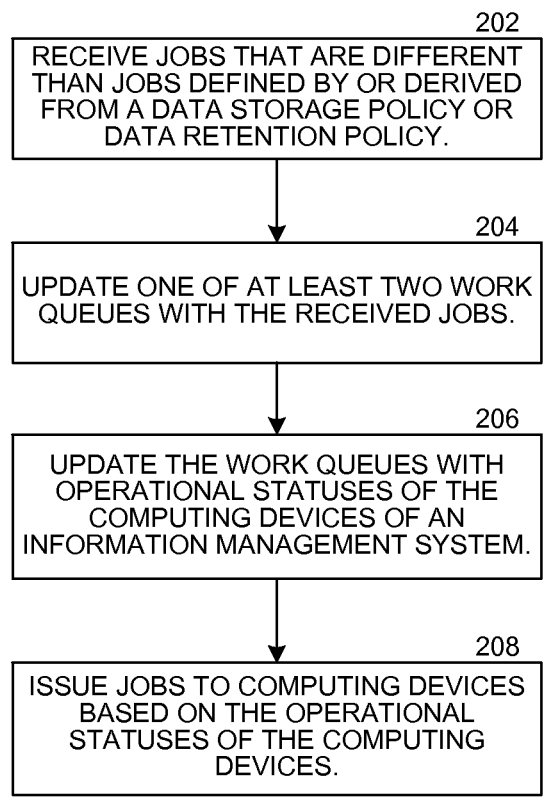
FIG. 2 is a flow diagram illustrating a method of managing a work flow queue in an information management system.

FIG. 2 illustrates a method 200 of managing a work queue of jobs, in an information management system, that are different than jobs defined in a data storage policy or a data retention policy. The method 200 may be executed in a system similar to the information management system 100, in accordance with one embodiment.

In block 202, a storage manager receives jobs from the Internet, from a software program, or from system administrators. The jobs are tasks other than the jobs defined by a data storage or data retention policy. The jobs can include tasks related to security patches, software updates, and synchronizing configuration changes throughout the information management system, according to various embodiments.

In block 204, the storage manager updates at least two work queues of jobs with the received jobs. In a first work queue, the storage manager organizes and schedules jobs or tasks that are associated with executing a data storage or data retention policy. A second work queue is associated with jobs or tasks that are of a different type than the jobs of the first work queue. For example, the jobs of the second work queue are unrelated to or are tangentially related to the jobs defined by the data storage or data retention policy, but execution of the jobs of the second work queue is needed for the information management system to operate or function.

At block 206, the storage manager updates the work queues with the statuses of computing devices to which the jobs are scheduled for assignment or distribution. The statuses of the computing devices of the information management system can include, for example, offline, online, available, busy, processing the job, job failed, job recently completed, job paused, or the like.

At block 208, the storage manager issues the jobs of the two or more work queues in accordance with priority settings for the jobs and based at least in part on a current status the computing devices to which the jobs are distributed. By configuring the storage manager to distribute jobs other than the jobs defined by data storage and retention policies, the storage manager can more efficiently manage network traffic, can protect itself from being bombarded by requests, and can supervise the use of processing resources in the computing devices of the information management system.

Throughput Failure Forecasting

In the event that one or more queued, scheduled, or issued jobs cannot be complete by a computing device within an allocated timeframe, it may be useful to alert or notify a system administrator or other users of the system deficiency. Issued jobs can fail to complete in a timely manner for a number of reasons. For example, the amount of data associated with the job can unexpectedly increase or spike, such that a predetermined window time becomes inadequate to complete a data transfer, given a fixed network throughput or bandwidth. As another example, the network throughput, i.e., rate or amount of data transfer over time, can diminish unexpectedly and/or significantly enough to render an allocated window of time inadequate to transfer a fixed amount of data between computing devices. As another example, a transmitting or receiving computing device involved in the execution of a particular job may crash, stall, or otherwise become inoperable to continue transferring or receiving the data associated with the execution of a job. In any of these scenarios, as well as in other potential scenarios, notification to appropriate personnel may enable a system or IT administrator to remedy any hardware or software issues that present an obstacle in executing a particular job. When information management system operations fail to occur during regularly scheduled windows of time, the operations failure can propagate throughout an information management system to cause further delays, similar to a traffic jam. The operations failure can also expose an organization's information to an undesirable amount of risk of loss while the organization's information is not being completely or partially backed up. Described hereafter are systems and methods for forecasting failures in information management system operations, in accordance with various embodiments of the disclosure.

Figure 3:
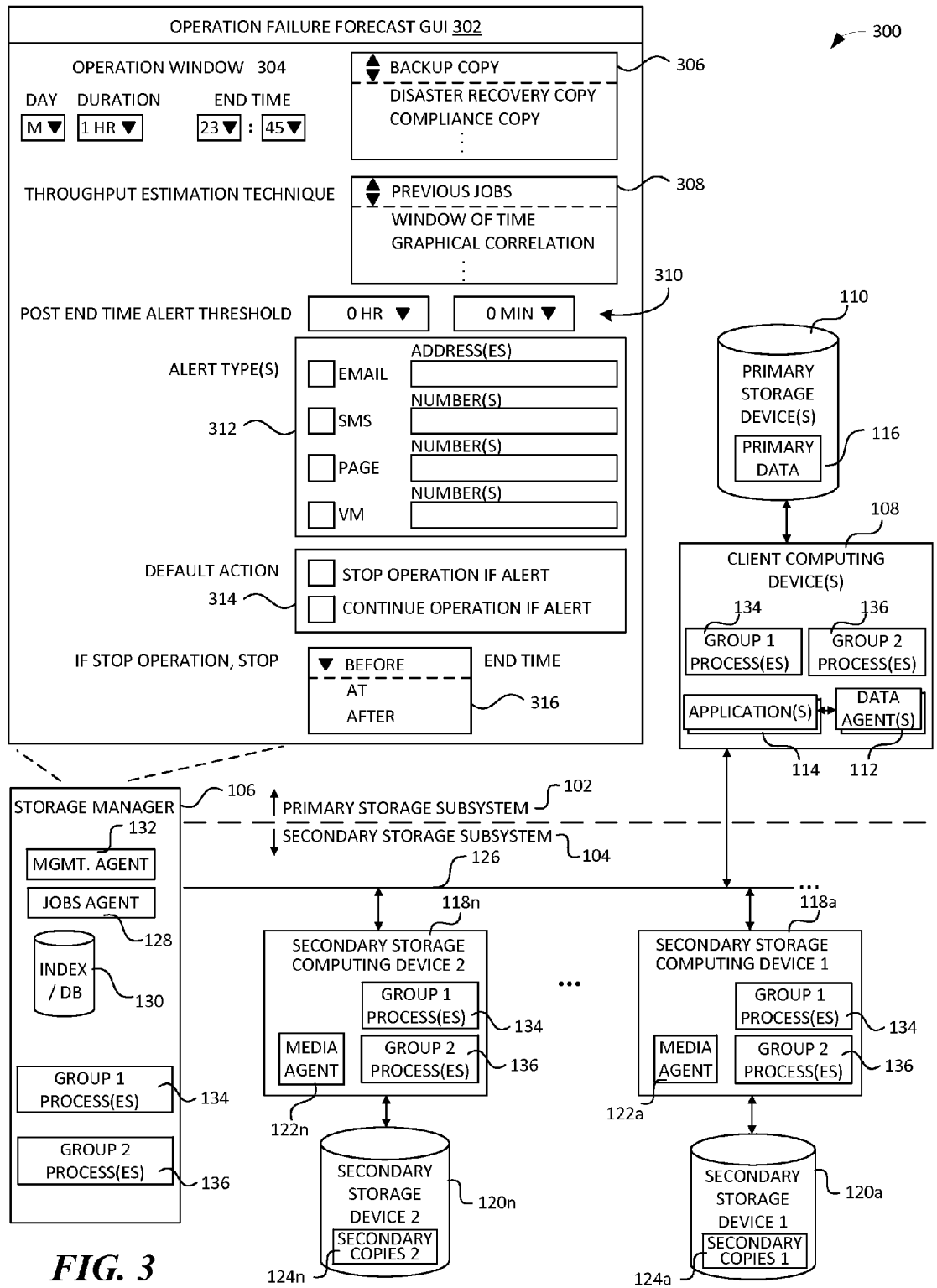
FIG. 3 is a block diagram illustrating a failure forecast interface.

FIG. 3 illustrates an information management system 300 that may be configured to provide an operation failure forecast interface 302. The operation failure forecast interface 302 may enable a user to set up parameters for forecasting information management operation failures and for generating alerts for the forecasted failures. The operation failure forecast interface 302 may be a web-based interface hosted by the storage manager 106, and may be accessible from any computing device, internal or external to the information management system 300. According to one implementation, the operation failure forecast interface 302 includes an operation window definition 304, an operation selection menu 306, a throughput estimation menu 308, an alert notification time 310, an alert selection menu 312, a default action menu 314, and a stop menu 316. The various windows, menus, and parameters illustrated in the operation failure forecast interface 302 enable users to customize the failure forecast feature, in accordance with the particular needs or preferences of a system administrator or other users of the information management system 300, as described below. While one example of an operation failure forecast interface 302 is shown, many other interfaces are possible.

System administrators regularly schedule resource intensive information management operations to coincide with the convenience of the system administrator and, more importantly, with the availability of network throughput. As used herein, network throughput includes a rate of data transfer from one computing device to another. Network throughput includes both the bandwidth of network communication channels and the processing availability and/or speeds of the computing devices involved in the data transfer. The network throughput may be measured end-to-end from a source device, through one or more networks, to a destination or target device. In other words, the network throughput is a measurement of the rate by which data is 1) processed by the source computing device for transfer over the network, 2) transferred from the source computing device to the target computing device, and/or 3) processed or temporarily stored by target computing device after receipt over the network. The particular data transfer or operation may have start time limitations that are based on the completion of other jobs, based on heavy network bandwidth usage, and/or based on an availability of other system components. An information management operation may have stop time limitations that are based on other scheduled information management operations, scheduled network maintenance, or an otherwise upcoming need for network resources. The operation failure forecast interface 302 provides users with an option of defining a particular operation window 304. As illustrated, the operation window 304 may be used to define a day for an operation, a duration for the operation, and an end time for the operation. The day for the operation may be defined in terms of days of the week, e.g., Sunday to Saturday, days of the month, days of a year, or the like. The duration option may also be defined by any one of a number of duration parameters, such as seconds, minutes, hours, days, or the like. The time may be displayed in 24-hour cycles or 12-hour cycles. Having the end time and the duration defined in the operation window 304, a need for a start time definition does not exist. However, in some embodiments, the operation window 304 includes a start time definition, in addition to, or in lieu of one or more of the other parameters illustrated.

In the operation menu 306, the operation failure forecast interface 302 allows a user to define the type of information management operation to apply the failure forecast alert to. The operation menu 306 can include a drop-down menu or any other suitable mode of option selection interface. The operation menu 306 may be populated with, for example, a backup copy, a disaster recovery copy, a compliance copy, an auxiliary copy, an archive copy, or the like. The operation menu 306 may also allow a user to select to more granular operation options, such as full backup, incremental backup, synthetic backup, or the like.

In some embodiments, upon selection of a particular operation from the operation menu 306, the operation failure forecast interface 302 displays a recommended duration of an operation window based on previous information management operations. For example, if the user allocates one hour to perform a full backup of a 10 TB computing system, when a previous similar operation consumed 10 hours, the operation failure forecast interface 302 may notify the user of the durations of previous similar operations that are based on timetables of operation histories. In some embodiments, the storage manager 106 stores tables of operation histories in the index 130.

The operation failure forecast interface 302 provides the throughput estimation menu 308 to allow users to select from a number of throughput estimation techniques. The throughput estimation menu 308 is illustrated as a drop-down menu, but can just as easily be implemented as a text box, a plurality of check boxes, radio buttons, or other graphical interface elements. The throughput estimation menu 308 illustrates at least three techniques that can be used by the storage manager to estimate the throughput of an information management operation. The techniques include a previous jobs technique, a window of time technique, and a graphical correlation technique. Each of these three techniques are described herein below.

According to one embodiment, the storage manager 106 estimates throughput for a job using throughput data from one or more previous jobs. The one or more previous jobs used in the estimation can be selected as a sample set for having varying degrees of relationship or correspondence with the operation selected in the operation menu 306. As a first example, one or more jobs that immediately preceded the selection of the job from the operation window 304 can be used to provide a current reflection of throughput within the information management system 300. As another example, the one or more jobs can be further filtered to more closely correlate with the job selected in the operation menu 306 by averaging one or more jobs that were executed between the same computing devices as the job selected in the operation menu 306. As yet another example, the one or more previous jobs used for the estimation of throughput can be estimated based on: average throughput of a same type of job (e.g., average of a number of incremental backups, full backups, etc.), time of operation of the one or more previous jobs, day of the week during which the jobs were executed, or the like.

Various mathematical functions can also be applied to the one or more previous jobs selected for throughput estimation, such as the average throughput of the previous jobs. For a more conservative estimation, the slowest or lowest throughput of the previous jobs can be used. For a more optimistic estimation, the fastest or highest throughput of the selected one or more previous jobs can be used to estimate the throughput of the job selected in the operation menu 306.

According to another embodiment, the storage manager estimates throughput for a job selected in the operation menu 306 by relying on throughput measurements from a particular window of time. The window can be selected to include the previous day's throughput measurements, several days of throughput measurements, a week, a month, or a year of data throughput measurements, or the like. A disadvantage or shortcoming of the window of time technique is that positive and negative spikes or extremes in throughput rates may not be accurately represented by an average of throughput measurements. For example, throughput rates measured on a Sunday may be significantly higher than actual rates achieved near the end of business on a Thursday or Friday when employees may be more prone to consume network bandwidth while surfing the Internet. Thus, a window of time that spans a week of throughput measurements, may correspond poorly with a particular time selected for the execution of a job. In one embodiment, the average of the throughput measurements is taken within the same window of time that the operation selected in the operation menu 306 is scheduled for. In other embodiments, the storage manager 106 uses statistical functions to estimate throughput rates associated with a window of time. For example, the storage manager 106 can calculate quartiles for throughput rates where the first quartile and second quartile represent throughputs that are less than the mean or average throughput data during the selected window of time, and the third and fourth quartiles represent throughput rates exceeding the average or mean throughput rates within the window of time. For a more conservative estimation of throughput, the storage manager 106 can use the average of the first quartile or the second quartile of throughput measurements. For more optimistic estimations, the storage manager 106 can use an average of the third quartile or the fourth quartile throughput measurements. Alternatively, the storage manager 106 can use the lowest throughput rate achieved during the window of time. This may provide a system administrator with a "worst-case scenario" estimation of how long a particular job could reasonably take. Other statistical operations may also be applied. For example, the applied statistical functions can include, among other things, determining and using one or more standard deviations below or above the mean throughput measurements.

In accordance with another embodiment, the storage manager 106 may employ graphical correlation techniques to estimate throughputs for a selected job. The historical graph of throughput measurements can be used to reflect cyclic variations in throughput over an extended period of time. For example, the storage manager 106 can be configured to graphically or mathematically determine cyclic patterns based on days of the week, days of the month, times of the month, months of the year, and the like.

Figure 4:
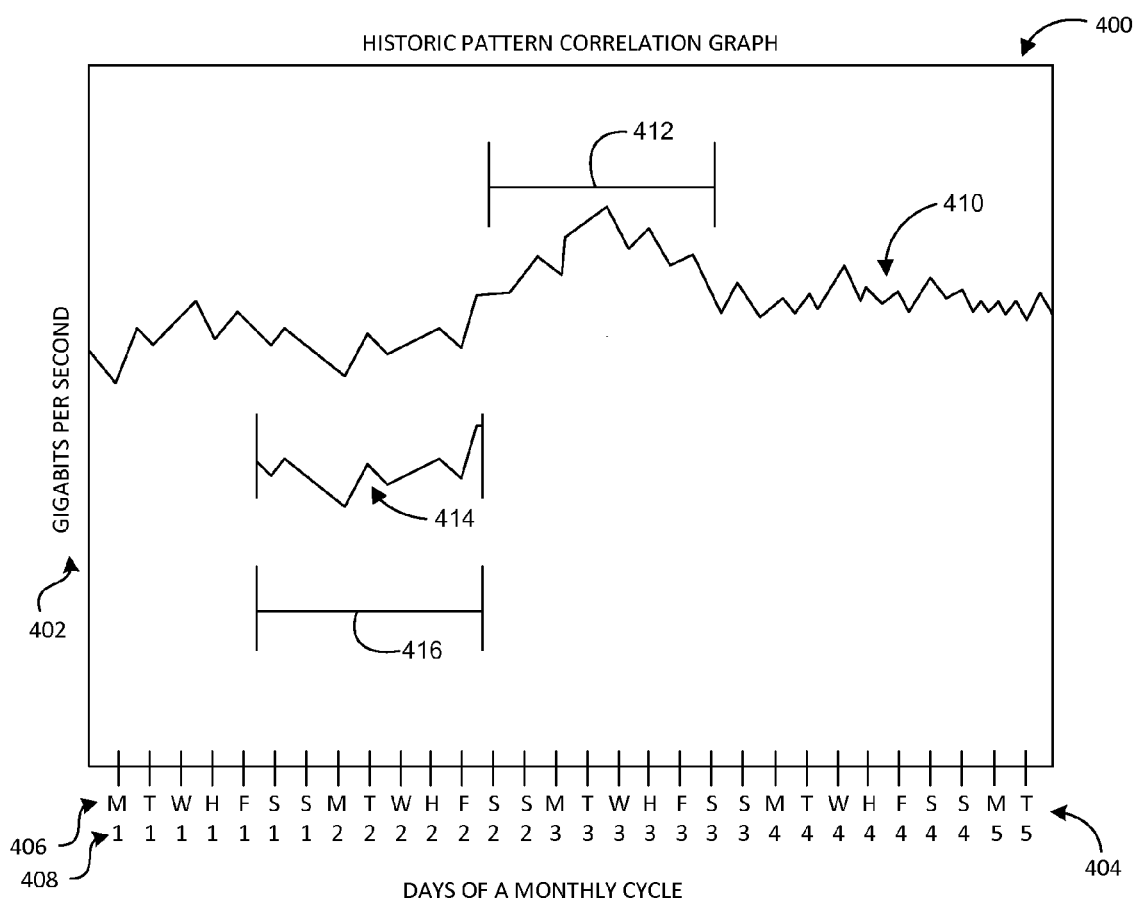
FIG. 4 is diagram illustrating a correlation graph that can be used to support the failure forecast interface of FIG. 3.

FIG. 4 illustrates a historic pattern correlation graph 400 that includes information that may be used by the storage manager 106 to estimate or forecast network throughput based on cyclical patterns in throughput measurements over time. The historic pattern correlation graph 400 may include a y-axis 402 that represents network throughput, a rate in terms of data per time (e.g., megabytes or gigabytes per second). The historic pattern correlation graph 400 also includes an x-axis 404. The x-axis 404 may include more than one reference for which throughput averages are taken. For example, the x-axis 404 can identify the days 406 of a monthly cycle, as well as the occurrence 408 of the days 406 in the monthly cycle. Because the beginning of a monthly cycle, an end of a monthly cycle, and a middle portion of a monthly cycle may exhibit similar throughput averages over time, such a representation or calculation may provide more precise estimations in future throughput. The graph 400 can include average data points that span a monthly cycle, an annual cycle, a semiannual cycle, or the like. As shown, certain times within a monthly cycle, e.g., time window for 412 of approximately seven days, may exhibit relatively higher or relatively lower throughput averages or measurements. A system administrator may receive notification of these relatively higher or lower throughput rates from the storage manager 106 while operating the operation failure forecast interface 302.

The storage manager 108 may correlate historical measurements with a recent snapshot of throughput measurements 414 to forecast upcoming trends. The storage manager 106 may compare the window of the recent throughput measurements 414 with the average throughput measurements 410 for a particular span of time 416, e.g., seven days. If the time window 412 correlates strongly with a section of the average throughput measurements 410, the storage manager 106 can rely on, as a forecast or estimate, the subsequently plotted throughput trends depicted by the average throughput measurements 410. In the event that the correlation between the throughput measurements 414 and the average throughput measurements 410 is weak, the storage manager 106 may indicate such weakness through the operation failure forecast interface 302 and may recommend use of alternative throughput estimation technique. To determine the correlation between the throughput measurements 414 and the average throughput measurements 410, the storage manager 106 may employ various mathematical operations, such as cross-correlation, correlation, convolution, or the like. An advantage of using historic pattern correlation is that cyclical patterns such as a weekend days or throughput associated with a middle of the month (versus the beginning or end of the month) may be captured over time and may provide a more reliable predictive indication of throughput.

Returning to FIG. 3, the operation failure forecast interface 302 allows the user to determine various additional parameters for generating a forecasted failure alert. For example, the alert threshold 310 allows a user to set a threshold for initiating an alert based on when, after the end time, a job is estimated to complete. For example, if the user wants to receive an alert if the job is estimated to exceed the end time by 30 minutes, then the user would enter 30 minutes in the alert threshold 310. The alert selection menu 312 allows the user to select one or more types of alert notifications, such as email, SMS, page, and voicemail. The alert selection menu 312 illustrates check boxes and text boxes for entering email addresses, cellular telephone numbers, page numbers, and telephone numbers. However, other selection menus, such as drop-down boxes, may also be implemented. The default action menu 314 allows a user to determine a default action for the storage manager 106 to take when a job is forecasted to not complete by the end time or by the alert threshold. In one embodiment, the storage manager 106 may be configured to stop a job once it is determined that the job will not complete by the end time. In other embodiments, the storage manager 106 can be configured to continue to process the job even after an alert has been sent. The stop menu 316 can be used to configure the storage manager 106 to stop a job at particular times, relative to the predetermined end time. For example, the storage manager 106 can be configured to stop a particular job before the end time, at the end time, or after the end time, depending upon various factors. Some of the various factors the user may consider include the priority of the job and network resource availability.

The storage manager 106 can also be configured to transmit alerts based on live throughput measurements between a receiving device and a transmitting device. For example, if the storage manager 106 is performing a backup operation of primary data 116 into the secondary storage device 120n, the storage manager may time or measure the rate at which a portion of a data transfer occurs by timing or measuring a delivery of, for example, a tenth of the overall size of data to be delivered. To illustrate, if the primary data being backed up is one terabyte, the storage manager 106 may estimate the throughput from the primary storage device 110 to the secondary storage device 120n based on the rate at which one or more preceding gigabytes of information are successfully transferred. Alternatively, prior to beginning an information management operation, the storage device can be configured to time the transmission of a pilot packet of data to determine a present estimate of throughput. In some embodiments, throughput is measured based on data transferred from a primary storage device 110 to a secondary storage device 120. However, in other embodiments, throughput is measured based on data transmitted from a primary storage device 110 to a secondary storage device 118, from a client computing device 108 to a secondary storage device 118, from a client computing device 108 to the secondary storage device 120, or the like.

The ability to forecast, predict, or estimate a failure in an information management operation to complete in a timely manner may enable a user to proactively trouble-shoot, manage, and/or repair the information management system 300. For example, as described above, a failure forecast can enable a system administrator to reschedule subsequent or preceding operations, can allow the system administrator to justify upgrading network hardware, can enable the system administrator to identify particular bottlenecks within the information management system 300, and/or may generally enable the system administrator to more confidently protect a particular organization's information.

Figure 5:
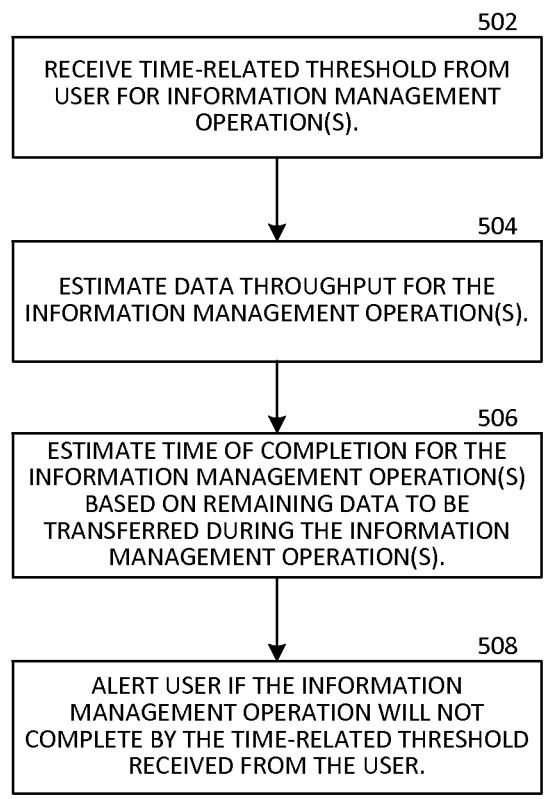
FIG. 5 is a flow diagram illustrating a method of providing failure forecast features in an information management system.

FIG. 5 illustrates a method of operating the information management system operation failure forecast features. As discussed above, the ability to forecast, predict, or estimate the failure of information management operations to complete in a timely manner may be a valuable tool to the system administrator or other users of an information management system.

At block 502, a computing device in an information management system receives a threshold, such as a time-related threshold, from a user, by which one or more information management operations should be complete. According to various embodiments, the time-related threshold may be set in terms of days of the week, days of a month, days of the year, and in terms of the start time, end time, and/or a duration for the information management operation. In other words, the threshold may define a window for which the operation should be completed.

At block 504, a computing device estimates data throughput for a selected information management operation. One or more techniques may be used to estimate and/or measure data throughput including, the use of previous jobs, the window of time, and/or cyclic patterns based on historic throughput measurements.

At block 506, the computing device estimates a time of completion for an information management operation based on the remaining data to be transferred during the information management operation and based on the estimated or measured throughput between a transmitting computing device in a receiving computing device. The estimated time of completion can be calculated according to Equation 1:

$$\text{time (in seconds)} = \text{data (in GB)} \div \text{throughput (in GB/s)}. \quad \text{(Equation 1)}$$

Although the units in Equation 1 are seconds and GB (gigabytes), other units can also be used, such as minutes, hours, days, megabytes, terabytes, and the like.

At block 508, the computing device alerts the user if the computing device estimates that the information management operation will not complete before or by the time-related threshold set by the user, e.g., Sunday, Dec. 29, 2013 at 11:00 p.m. The computing device can use any one of a number of methods for transmitting the alert to the user, including, email, text message, a page, an electronic voicemail, or the like.

Escalating Alerts

The information management system 300, as described above, can be configured to generate an alert when an information management operation, such as the jobs illustrated in the first work queue 138 and the second work queue 140 (shown in FIG. 1) are forecasted or estimated to be incomplete by a predetermined time. The system 300 can be configured to generate a number of other alerts related to the information management system 300. For example, the storage manager 106, the client computing devices 108, and/or the secondary storage computing devices 118 can be configured to generate alerts related to application management, automatic updates, configuration alerts, job management alerts, media management alerts, operation management alerts, and the like. More specifically, the information management system 300 can be configured to generate alerts when one or more of the following occur: a Microsoft exchange mailbox exceeds a particular limit; when software downloads, updates, or upgrades become available; when a storage manager, client, media agent, or data agent configuration has been changed; when a data aging, data classification, data protection, data recovery, or data verification operation stalls, fails, or completes; when one or more media drives or media libraries go offline unexpectedly or generate an error; or any other data management event.

Some alerts occur regularly within an information management system and may be disregarded or addressed at the convenience of the system administrator. Other alerts, however, may significantly impact an information management system's ability to protect or otherwise adequately manage an organization's information. For example, alerts associated with online to offline status changes of secondary storage devices and storage libraries can be particularly problematic and can inhibit the execution of many important storage and/or retention operations. An information management system can be configured to generate an alert in response to various alert generating events. However, alerts can go unanswered when, for example, alerts are sent to employees who are: on vacation, no longer employed with the organization, away from the office, sick, on bereavement leave, or involved in any one of a number of personal matters that may hinder or prevent an alert recipient from addressing the underlying event which caused the alert. According to one embodiment, an information management system, e.g., information management system 300 can be configured to automatically escalate an unacknowledged alert up a chain of management until the alert is acknowledged and/or someone takes remedial action to resolve the alert-causing event.

Figure 6:
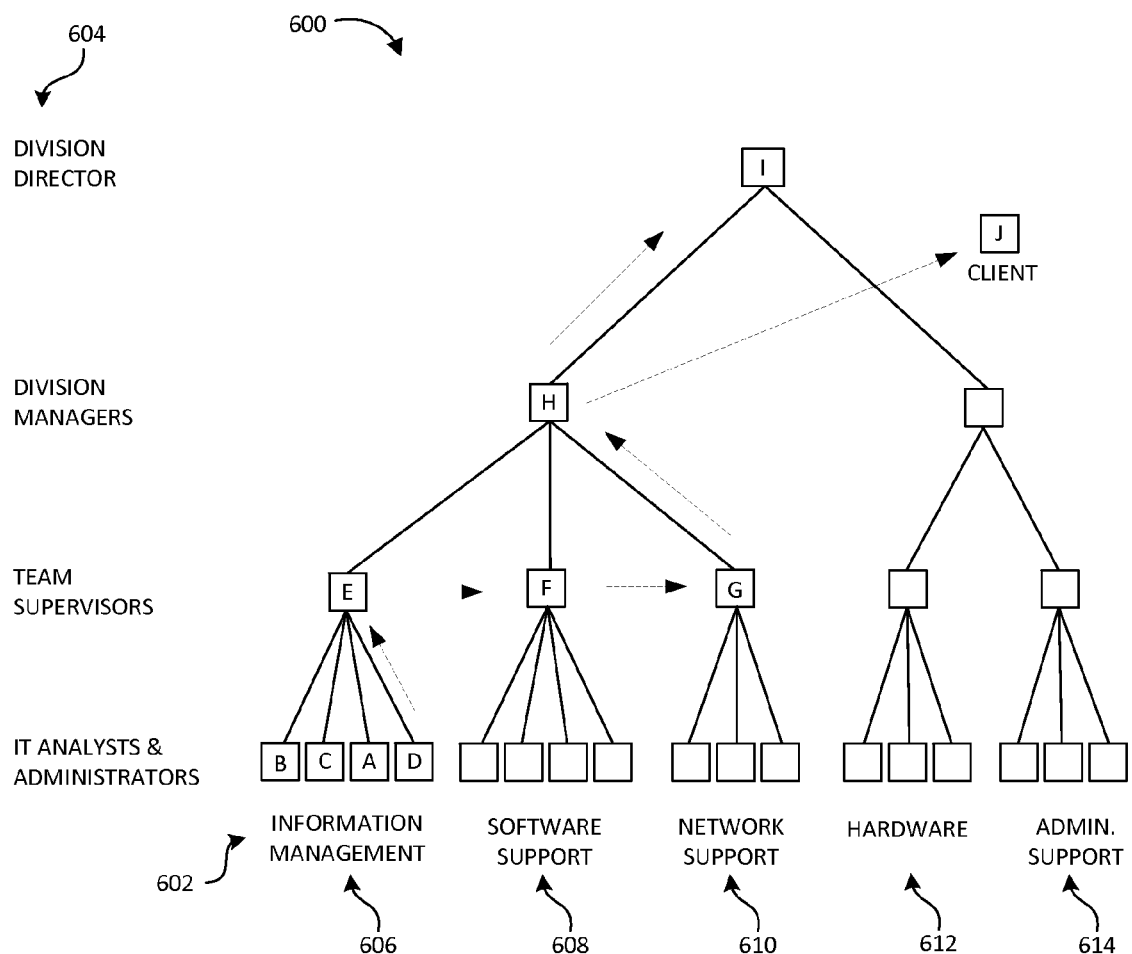
FIG. 6 is an organizational diagram illustrating an information management system alert escalation.

FIG. 6 illustrates an employee hierarchy chart 600 of an organization that shows an embodiment of an alert escalation path that a storage manager 106 can be configured to execute when selected alerts or selected events occur within an information management system. As discussed above, some of the selected events or selected alerts may be associated with events that prevent or hinder an information management system from protecting an organization's information. The employee hierarchy chart 600 represents a hierarchy of individuals who may be responsible for maintaining an information management system, e.g., information management systems 100, 300. While the lowest layer of employees in the chart 600 are principally responsible for acknowledging, addressing, and/or remedying alert-causing events, ultimate responsibility for remedying an event-driven alert terminates with the person at the top of the hierarchy, e.g. an IT division director.

The employee hierarchy chart 600 may include groups of task specific teams 602 and layers of management 604, according to one embodiment. The task specific teams 602 may include teams of IT administrators or personnel who are responsible for implementing, maintaining, and updating the information technology infrastructure and organization. The task specific teams 602 may include an information management team 606, a software support team 608, a network support team 610, a hardware team 612, and an administrative support team 614. The information management team 606 may be responsible for all the tasks associated with ensuring that data storage and data retention policies are executed adequately. The other teams 608-614 may be responsible for all other IT-related tasks within an organization, such as installing new applications and operating systems, updating and maintaining communications networks, creating new usernames and passwords on clients for employees, purchasing and setting up new computers/clients, and the like.

The storage manager 106 may be configured to elevate specific alerts according to a priority, hierarchy, or set of rules. For example, an alert priority rule or alert escalation rule related to information management operation alerts can be defined to be transmitted to various members of the information management team 606, to team supervisors, to division managers, and finally to the director or to a client. In practice, the storage manager 106 can be configured to first transmit an alert to team member "A" of the information management team 606. According to some embodiments, team members within the information management team 606 can receive a designation of team member "A" for different specific alerts or different types of alerts to distribute responsibility for highest priority alerts among different members of the information management team 606. The storage manager 106 may be configured to wait for acknowledgment of the alert for a predetermined amount of time, e.g., 30 minutes. The storage manager 106 may then escalate the alert to team member "B", if the alert remains unacknowledged by the expiration of the alert acknowledgement time limit. The storage manager 106 can be configured to escalate the alert to other members of the information management team 606, repeatedly providing each team member with a predetermined amount of time to acknowledge the alert. If all of the team members of one team fail to timely acknowledge the alert, the storage manager may escalate the alert to a higher layer of management. For example, if the information management team 606 includes team members A, B, C, and D, the storage manager 106 may be configured to escalate an unacknowledged alert to team member "E", who is the supervisor for the information management team 606. In the absence of an acknowledgment from team supervisor E, the storage manager 106 can be configured to escalate the alert to team supervisor F and team supervisor G before escalating the alert to the next level of management. The storage manager 106, in some embodiments, may be configured to escalate unacknowledged alerts to the division manager H, followed by escalating the alert to the division director I and/or to the client J. In some embodiments, the employee hierarchy chart 600 represents a team that is responsible for IT support within an organization for which the information management operation alert is generated. In other embodiments, the employee hierarchy chart 600 represents an outside IT services group or firm that has been hired to manage information management operations and/or information management operation alerts for another organization, such as a client J.

Although the employee hierarchy chart 600 illustrates one embodiment of an alert escalation path, the storage manager 106 can be configured to execute or escalate alerts using other priority paths or other escalation rules. For example, according to various embodiments, the amount of time between generating an alert and escalating an alert can be increased or decreased. Furthermore, the alerts can be transmitted to all members of the lowest level of management 604 prior to escalating the alert to a higher level of management. In some embodiments, the storage manager 106 is configured to escalate an alert within a first level of management for a predetermined duration, e.g., 30 minutes, before escalating the alerts to a higher level of management 604. Additional options for setting and adjusting escalation priority rules are described below in the discussion related to FIG. 8.

Figure 7:
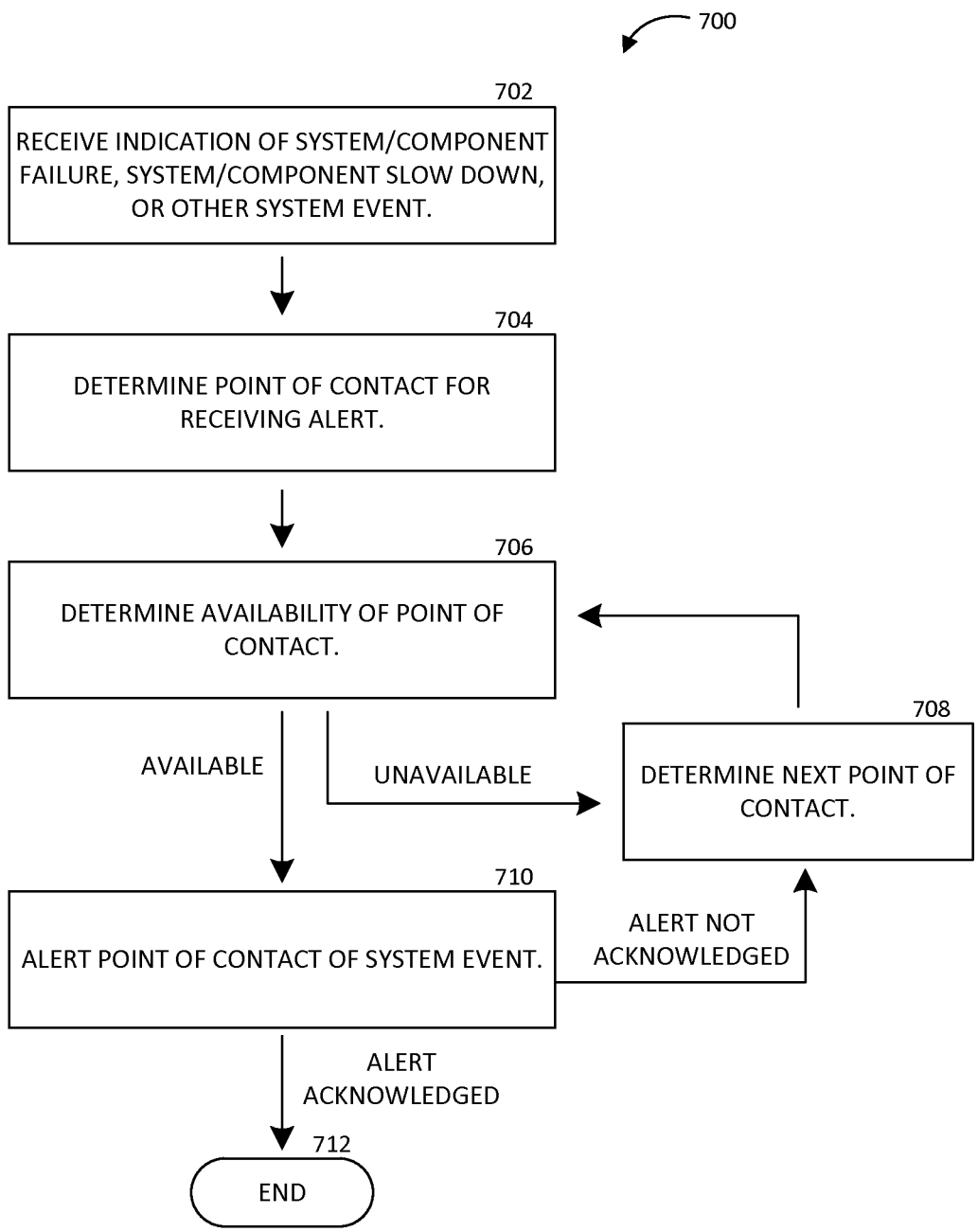
FIG. 7 is a flow diagram illustrating a method of providing alert escalation services for an information management system.

FIG. 7 illustrates a flow diagram of a method 700 that may be executed by a storage manager or other computing device within an information management system, to escalate information management operation alerts. Escalation of alerts within a hierarchy of a team responsible for an information management system can advantageously reduce an amount of time elapsed between an alert-causing event and acknowledgement (and remedy) of the alert.

At block 702, a computing device receives an indication of a system failure, a system slowdown, or other alert-causing information management system event. For example, a computing device can receive an indication that a secondary storage device has unexpectedly changed from an online status to an offline status. Such an event may prevent an information management system from executing backup operations and leave an organization's information partially or fully exposed to a greater risk of information loss than the organization may want to exposure to.

At block 704, a computing device determines a point of contact for receiving an alert. The alert can relate to the indication of system failure, system slowdown, or other system event triggered in block 702. The computing device may determine a first point of contact by referring to a set of rules, an employee hierarchical chart, or a service team hierarchical chart, or by progressing through a list of manually entered contacts.

At block 706, the computing device determines the availability of a point of contact using, for example, directory services. The computing device may use directory services such as Microsoft's Active Directory or Lync, Novell's eDirectory, Apache's ApacheDS, Oracle's Oracle Internet Director, OpenDS, or the like. Many directory services include specific application programming interfaces or are compatible with a generic directory access protocol, such as LDAP (lightweight directory access protocol). By querying various directory services attributes, e.g., organizationStatus, meetingEndTime, meetingStartTime, and meetingScope, the computing device can determine whether the point of contact is still an employee, is out of the office, is in a meeting, is on a phone call, or is otherwise unavailable to acknowledge and/or respond to an alert. For example, the computing device can call a home or mobile telephone number and determine that the point of contact is unavailable if the call is directed to a voice mailbox. In some implementations, the computing device can be configured to try calling the point of contact several time, e.g., three calls in 60 minutes, before determining that a point of contact is unavailable. If the point of contact is deemed unavailable, the method 700 proceeds to block 708. If the point of contact is available, the method proceeds to block 710.

At block 708, the computing device determines a next point of contact to receive the alert. The computing device can determine the next point of contact by referencing one or more tables, organizational tables, charts, or by stepping through an automatically or manually generated list of points of contact that may or may not be prioritized by seniority or job function within an organization. For example, if a primary point of contact is an IT administrator, the next point of contact may be that IT administrator's supervisor or manager. In other embodiments, the computing device may determine that the next point of contact is a person having a peer relationship with the primary point of contact. After exhausting a list of peers of the primary point of contact, the computing device may then be configured to escalate the alert to points of contact having supervisory relationships or roles with respect to the primary points of contact. Block 708 then proceeds to block 706, where the computing system determines the availability of the next point of contact. The method 700 may alternate between block 706 and block 708 until an available point of contact is located within an organization's system.

At block 710, the computing system alerts or notifies the available point of contact of the alert-generating system event. According to various embodiments, the computing device may alert the available point of contact using one or more of any number of electronic resources. For example, the computing device may alert the available point of contact using a pager, a cell phone (e.g., text message and/or an electronic recording), an email, a home telephone, an RSS feed, or the like. In some implementations, the computing system alerts more than one person at a time. For example, the computing system can be configured to alert a point of contact and his/her supervisor (such as copying them on emails to the point of contact). The duplicative notification may allow the point of contact's supervisor to be forewarned of escalating alerts, so as not to be taken by surprise when an alert is escalated to the supervisor.

After transmitting one or more alerts to the available point of contact, the computing device can be configured to escalate and/or retransmit the alert to a next available point of contact, if the first available point of contact fails to acknowledge, respond to, and/or remedy the initial event that generated the alert. The computing device, for example, can host a web-based interface into which team members of the employee hierarchy chart 600 can login and acknowledge receipt of the alert. If the alert is not acknowledged within a predetermined period of time, the method 700 proceeds to block 708. If the available point of contact acknowledges the alert within the predetermined time, the method 700 ends at block 712.

Figure 8:
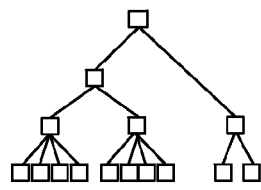
FIG. 8 is a detailed view illustrating a user interface for alert escalation services for an information management system.

FIG. 8 illustrates an alert escalation interface 800 hosted/provided by one or more computing devices of the information management systems 100, 300, in accordance with various embodiments. In a particular embodiment, the storage manager 106 is configured to host the alert escalation interface 800 to enable a user to establish or adjust alert escalation priorities and rules from one or more computing devices within the information management system. The alert escalation interface 800 can include several windows such as events for escalation window 802, devices to alert window 804, an availability tracking window 806, a location tracking window 808, and a point of contact priority window 810. While one example of the alert escalation interface is shown in FIG. 8, many others are of course possible.

The events for escalation window 802 enables a system administrator or other user to select from one or more events related to an information management system 100, 300. Based on the selection of events from the events for escalation window 802, a computing device can be configured to alert or notify one or more points of contact of equipment failures, job or task failures, performance changes, or the like. Some examples of events that may be selected to generate an alert and that may be alert escalated include: a client device not being backed up for a specified number of days; reaching a maximum number of documents/files/data size for a data agent; failing to restore a job; low disk space on a client; a device going offline; failing to access or mount storage media; and/or low disk space available for a software module, such as a media agent. This list of examples is but a few of tens or hundreds of system events selectable by a user for alert escalation.

The devices to alert window 804 may allow a user to select a mode by which to transmit an alert. As illustrated, electronic modes of notification can include a page, cellular phone messages, email, home telephone, updating a network feed, and the like. Although not shown, various forms of social networking applications may also be used to notify one or more individuals of an alert. For example, the alert escalation interface 800 may enable the storage manager 106 to hook into various forms of social media, e.g., Facebook, Twitter, Google Circles, or the like to distribute alerts, if authorized by the list of points of or by individual points of contact within the list of points of contact. Additional features related to connecting social networking applications may be incorporated into the alert escalation interface 800, as disclosed in commonly assigned U.S. Patent Application Publication 2013/0263289, titled "INFORMATION MANAGEMENT OF DATA ASSOCIATED WITH MULTIPLE CLOUD SERVICES," which is hereby incorporated by reference in its entirety.

The availability tracking window 806 may allow the system administrator to define which conditions constitute the availability or unavailability of a point of contact. As described above, the storage manager 106 can be configured to use one or more types of directory services to determine or track the unavailability of a particular point of contact. For example, some internet protocol ("IP") telephones and private branch exchange ("PBX") telephones can connect with directory services to indicate that a point of contact is using the telephone. Through directory services, the storage manager 106 can determine if a point of contact has a directory services status of: out of office, in a meeting, on a telephone call, engaged in a calendared event, etc.

The storage manager 106 can also be configured to connect with various social networking applications of the list of points contact and use APIs associated with the networking applications to determine a status of a user. For example, a point of contact may use Facebook's location feature to specify the location of their post (e.g., a park, a movie, theater, a restaurant, or other attraction). The post with the location may include a map or other coordinate-based information that the storage manager 106 may use to determine the location of the point of contact. Other social networking applications, such as Google Circles, Foursquare, and the like may be similarly manipulated by the storage manager 106 to determine the location of a point of contact.

The availability tracking window 806 enables a system administrator to define which status or statuses should be interpreted by the system as unavailable. For example, a point of contact may be unavailable if out of the office or if in a meeting, but may be defined as available if on telephone call or if an Outlook calendar item is not a meeting or conference, i.e., it is simply an informational reminder or entry.

The location tracking window 808 enables a system administrator to authorize tracking of one or more persons on a list of points of contact. Examples of options can include cell phone location tracking and laptop IP address tracking. It is common for companies and other organizations to issue communication devices, such as smart phones, to employees to enable the employees to be more responsive to the needs of the company or organization. Many communication devices are now equipped with location services that are based on global positioning systems (GPS) and/or wireless service provider-based location tracking, e.g., using triangulation. An organization may, according to some embodiments, install a program or application onto a work-assigned communication device and configure the program to: 1) acquire a location of the communication device; and 2) update directory services with the location of the communications device, utilizing, for example, web-based services. Thus, if enabled, a storage manager 106 may determine that a point of contact is unavailable, if the point of contact's location exceeds, for example, a predefined radius from the company's or organization's location.

In other embodiments, the storage manager 106 may track an IP address of a laptop or other electronic device assigned to a point of contact in an organization. One or more programs can be installed on a laptop or other electronic device to gather and transmit the device's IP address to a database or directory service. The program installed on the laptop may run operating system commands, such as "ipconfig", to determine a current IP address of the laptop or other device. The storage manager 106 may be configured to use one or more reverse lookup programs or resources to determine the general location of the mobile device. Examples of reverse lookup resources include websites such as "whois.net", "ipaddress.com", or the like. Other techniques for determining a location of a mobile device are disclosed in commonly assigned U.S. patent application Ser. No. 13/728,386, titled, "APPLICATION OF INFORMATION MANAGEMENT POLICIES BASED ON OPERATION WITH A GEOGRAPHIC ENTITY," which is hereby incorporated by reference in its entirety.

The location tracking window 808 may also enable a system administrator or other user to enable the information management system 100, 300 to track an employee using a building security system. Many organizations utilize electronic access means, such as swipe cards, RFID cards, biometric scanners, etc., to monitor and track whether an employee is on the premises of the organization. Some electronic access means provide access to a building, and other electronic access means provide access to parking facilities associated with an organization's building. When authorized, the storage manager 106 may query the computing system or data structure used in a building security system to determine if a point of contact is in a building or parking facility associated with an organization, prior to sending an alert to the point of contact or prior to escalating an alert beyond the point of contact.

The point of contact priority window 810 enables selection of one of a number of techniques for determining primary and subsequent points of contacts to whom alerts are sent in response to error-related and/or failure-related events within an information management system. The point of contact priority window 810 may enable a user to select or determine an alert escalation rule using manual parameters 812, team-based parameters 814, or using graphically assigned parameters 816. Manual parameters 812 may include a name, username, phone number, or email address of one or more points of contact for the storage manager 106 to incrementally contact. The team-based parameters 814 may allow a user to prioritize teams within an IT department that are contacted in response to an alert-causing system event. Graphically assigned parameters 816 may enable a user to graphically assign an order of alert escalation, as described in the discussion related to FIG. 6.

Information displayed in the point of contact priority window 810 can be based on information acquired from one or more system directories. For example, the team-based priority parameters 814 and the graphically assigned parameters 816 can be populated by performing an Active Directory query of each subgroup in the IT department and displaying the results for prioritization by the user. A similar query can be used to populate the graphically assigned parameters 816. As a result, utilization of system directories, such as Active Directory, enables the alert escalation interface 800 to enable a user to select from and prioritize alert delivery for various members of an IT support team, or other groups responsible for information management operations support.

Hereafter, various example systems are illustrated and described to provide further example embodiments into which the systems and methods of FIGS. 1-8 may be implemented. Additionally, systems illustrated in FIGS. 9A-9H, and related discussions, further expound on features of each of the components introduced in information management systems 100 and 300. Taken together with the disclosure of FIGS. 1-8, the systems of FIGS. 9A-9H further enable work queue management, estimating or forecasting information management operation failures, and escalation of information management system alerts to resolve system errors, failures, and performance glitches.

Information Management System Overview

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 9A:
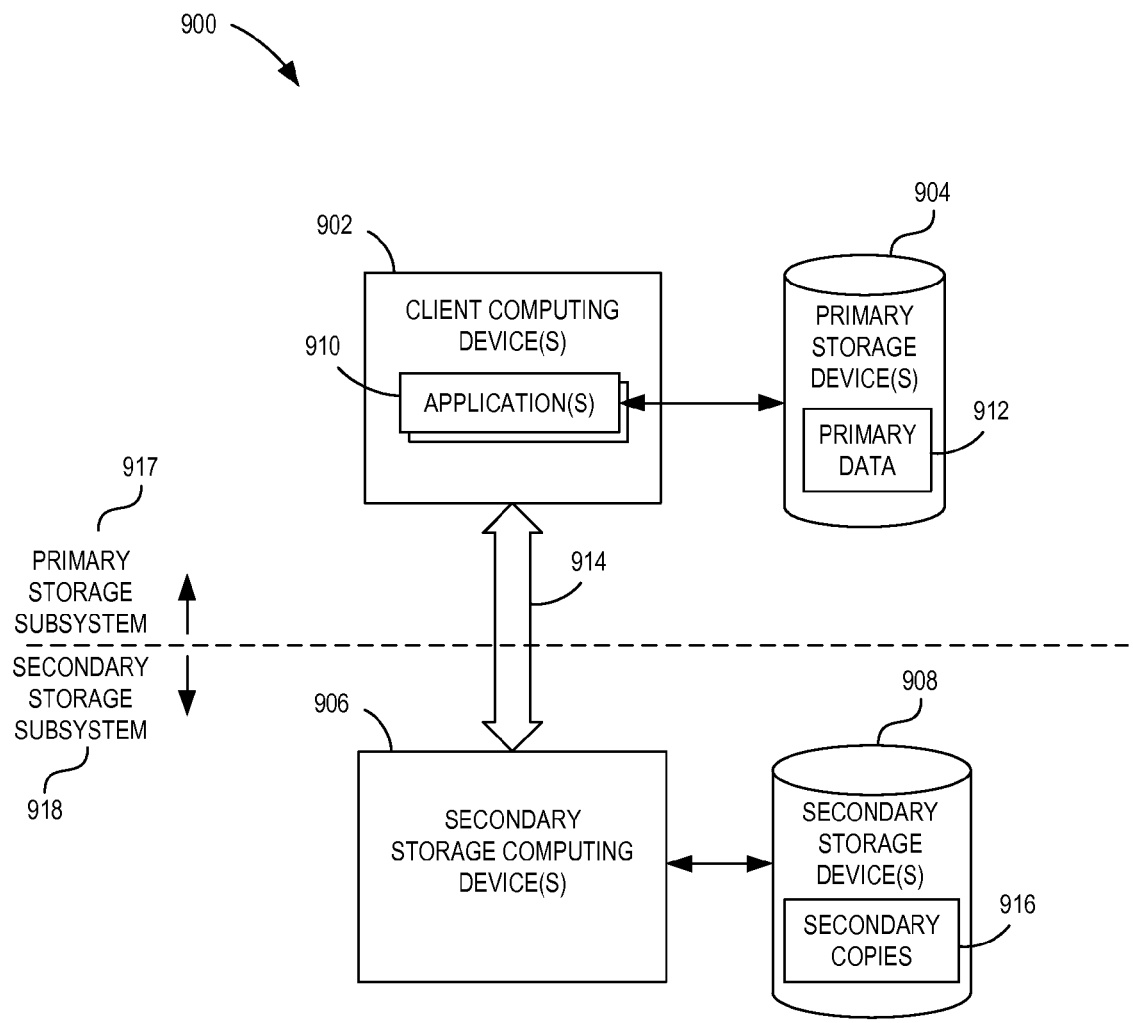
FIG. 9A is a block diagram illustrating an information management system.

Certain embodiments described herein provide systems and methods capable of addressing these and other shortcomings of prior approaches by implementing unified, organization-wide information management. FIG. 9A shows one such information management system 900, which generally includes combinations of hardware and software configured to protect and manage data and metadata generated and used by the various computing devices in the information management system 900.

The organization which employs the information management system 900 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 7,035,880, entitled "Modular Backup and Retrieval System Used in Conjunction With a Storage Area Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,246,207, entitled "System and Method for Dynamically Performing Storage Operations in a Computer Network";

U.S. Pat. No. 7,747,579, entitled "Metabase for Facilitating Data Classification";

U.S. Pat. No. 8,229,954, entitled "Managing Copies of Data";

U.S. Pat. No. 7,617,262, entitled "System and Methods for Monitoring Application Data in a Data Replication System";

U.S. Pat. No. 7,529,782, entitled "System and Methods for Performing a Snapshot and for Restoring Data";

U.S. Pat. No. 8,230,195, entitled "System And Method For Performing Auxiliary Storage Operations";

U.S. Pat. No. 7,315,923, entitled "System And Method For Combining Data Streams In Pipelined Storage Operations In A Storage Network";

U.S. Pat. No. 8,364,652, entitled "Content-Aligned, Block-Based Deduplication";

U.S. Pat. Pub. No. 2006/0224846, entitled "System and Method to Support Single Instance Storage Operations";

U.S. Pat. No. 8,578,120, entitled "Block-Level Single Instancing";

U.S. Pat. Pub. No. 2009/0319534, entitled "Application-Aware and Remote Single Instance Data Management";

U.S. Pat. Pub. No. 2012/0150826, entitled "Distributed Deduplicated Storage System";

U.S. Pat. Pub. No. 2012/0150818, entitled "Client-Side Repository in a Networked Deduplicated Storage System";

U.S. Pat. No. 8,170,995, entitled "Method and System for Offline Indexing of Content and Classifying Stored Data";

U.S. Pat. No. 7,107,298, entitled "System And Method For Archiving Objects In An Information Store";

U.S. Pat. No. 8,230,195, entitled "System And Method For Performing Auxiliary Storage Operations";

U.S. Pat. No. 8,229,954, entitled "Managing Copies Of Data"; and

U.S. Pat. No. 8,156,086, entitled "Systems And Methods For Stored Data Verification".

The information management system 900 can include a variety of different computing devices. For instance, as will be described in greater detail herein, the information management system 900 can include one or more client computing devices 902 and secondary storage computing devices 906.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 900 can also include a variety of storage devices, including primary storage devices 904 and secondary storage devices 908, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 900 includes one or more client computing device 902 having at least one application 910 executing thereon, and one or more primary storage devices 904 storing primary data 912. The client computing device(s) 902 and the primary storage devices 904 may generally be referred to in some cases as a primary storage subsystem 917. A computing device in an information management system 900 that has a data agent 942 installed on it is generally referred to as a client computing device 902 (or, in the context of a component of the information management system 900 simply as a "client").

Depending on the context, the term "information management system" can refer to generally all of the illustrated hardware and software components. Or, in other instances, the term may refer to only a subset of the illustrated components.

For instance, in some cases, the information management system 900 generally refers to a combination of specialized components used to protect, move, manage, manipulate, analyze, and/or process data and metadata generated by the client computing devices 902. However, the information management system 900 in some cases does not include the underlying components that generate and/or store the primary data 912, such as the client computing devices 902 themselves, the applications 910 and operating system residing on the client computing devices 902, and the primary storage devices 904. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 900, the data generation sources include the one or more client computing devices 902.

The client computing devices 902 may include any of the types of computing devices described above, without limitation, and in some cases the client computing devices 902 are associated with one or more users and/or corresponding user accounts, of employees or other individuals.

The information management system 900 generally addresses and handles the data management and protection needs for the data generated by the client computing devices 902. However, the use of this term does not imply that the client computing devices 902 cannot be "servers" in other respects. For instance, a particular client computing device

902 may act as a server with respect to other devices, such as other client computing devices 902. As just a few examples, the client computing devices 902 can include mail servers, file servers, database servers, and web servers.

Each client computing device 902 may have one or more applications 910 (e.g., software applications) executing thereon which generate and manipulate the data that is to be protected from loss and managed.

The applications 910 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 902 can have at least one operating system (e.g., Microsoft Windows, Mac OS X, iOS, IBM z/OS, Linux, other Unix-based operating systems, etc.) installed thereon, which may support or host one or more file systems and other applications 910.

As shown, the client computing devices 902 and other components in the information management system 900 can be connected to one another via one or more communication pathways 914. The communication pathways 914 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 914 in some cases may also include application programming interfaces (APIs) including, e.g., cloud service provider APIs, virtual machine management APIs, and hosted service provider APIs.

Primary Data and Exemplary Primary Storage Devices

Primary data 912 according to some embodiments is production data or other "live" data generated by the operating system and other applications 910 residing on a client computing device 902. The primary data 912 is generally stored on the primary storage device(s) 904 and is organized via a file system supported by the client computing device 902. For instance, the client computing device(s) 902 and corresponding applications 910 may create, access, modify, write, delete, and otherwise use primary data 912. In some cases, some or all of the primary data 912 can be stored in cloud storage resources.

Primary data 912 is generally in the native format of the source application 910. According to certain aspects, primary data 912 is an initial or first (e.g., created before any other copies or before at least one other copy) stored copy of data generated by the source application 910. Primary data 912 in some cases is created substantially directly from data generated by the corresponding source applications 910.

The primary data 912 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 904 storing the primary data 912 may be relatively fast and/or expensive (e.g., a disk drive, a hard-disk array, solid state memory, etc.). In addition, primary data 912 may be intended for relatively short term retention (e.g., several hours, days, or weeks).

According to some embodiments, the client computing device 902 can access primary data 912 from the primary storage device 904 by making conventional file system calls via the operating system. Primary data 912 representing files may include structured data (e.g., database files), unstructured data (e.g., documents), and/or semi-structured data. Some specific examples are described below with respect to FIG. 9B.

It can be useful in performing certain tasks to organize the primary data 912 into units of different granularities. In general, primary data 912 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 900 to access and modify metadata within the primary data 912. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 910 and/or other components of the information management system 900 maintain indices of metadata for data objects, e.g., metadata associated with individual email messages. Thus, each data object may be associated with corresponding metadata. The use of metadata to perform classification and other functions is described in greater detail below.

Each of the client computing devices 902 are generally associated with and/or in communication with one or more of the primary storage devices 904 storing corresponding primary data 912. A client computing device 902 may be considered to be "associated with" or "in communication with" a primary storage device 904 if it is capable of one or more of: routing and/or storing data to the particular primary storage device 904, coordinating the routing and/or storing of data to the particular primary storage device 904, retrieving data from the particular primary storage device 904, coordinating the retrieval of data from the particular primary storage device 904, and modifying and/or deleting data retrieved from the particular primary storage device 904.

The primary storage devices 904 can include any of the different types of storage devices described above, or some other kind of suitable storage device. The primary storage devices 904 may have relatively fast I/O times and/or are relatively expensive in comparison to the secondary storage devices 908. For example, the information management system 900 may generally regularly access data and metadata stored on primary storage devices 904, whereas data and metadata stored on the secondary storage devices 908 is accessed relatively less frequently.

In some cases, each primary storage device 904 is dedicated to an associated client computing device 902. For instance, a primary storage device 904 in one embodiment is a local disk drive of a corresponding client computing device 902. In other cases, one or more primary storage devices 904 can be shared by multiple client computing devices 902, e.g., via a network such as in a cloud storage implementation. As one example, a primary storage device 904 can be a disk array shared by a group of client computing devices 902, such as one of the following types of disk arrays: EMC Clariion, EMC Symmetrix, EMC Celerra, Dell EqualLogic, IBM XIV, NetApp FAS, HP EVA, and HP 3PAR.

The information management system 900 may also include hosted services (not shown), which may be hosted in some cases by an entity other than the organization that employs the other components of the information management system 900. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 900, e.g., as primary data 912. In some cases, the hosted services may be accessed using one of the applications 910. As an example, a hosted mail service may be accessed via browser running on a client computing device 902. The hosted services may be implemented in a variety of computing environments. In some cases, they are implemented in an environment having a similar arrangement to the information management system 900, where various physical and logical components are distributed over a network.

Secondary Copies and Exemplary Secondary Storage Devices

The primary data 912 stored on the primary storage devices 904 may be compromised in some cases, such as when an employee deliberately or accidentally deletes or overwrites primary data 912 during their normal course of work. Or the primary storage devices 904 can be damaged or otherwise corrupted.

For recovery and/or regulatory compliance purposes, it is therefore useful to generate copies of the primary data 912. Accordingly, the information management system 900 includes one or more secondary storage computing devices 906 and one or more secondary storage devices 908 configured to create and store one or more secondary copies 916 of the primary data 912 and associated metadata. The secondary storage computing devices 906 and the secondary storage devices 908 may sometimes be referred to as a secondary storage subsystem 918.

Creation of secondary copies 916 can help in search and analysis efforts and meet other information management goals, such as: restoring data and/or metadata if an original version (e.g., of primary data 912) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 902 access or receive primary data 912 and communicate the data, e.g., over the communication pathways 914, for storage in the secondary storage device(s) 908.

A secondary copy 916 can comprise a separate stored copy of application data that is derived from one or more earlier-created, stored copies (e.g., derived from primary data 912 or another secondary copy 916). Secondary copies 916 can include point-in-time data, and may be intended for relatively long-term retention (e.g., weeks, months or years), before some or all of the data is moved to other storage or is discarded.

In some cases, a secondary copy 916 is a copy of application data created and stored subsequent to at least one other stored instance (e.g., subsequent to corresponding primary data 912 or to another secondary copy 916), in a different storage device than at least one previous stored copy, and/or remotely from at least one previous stored copy. In some other cases, secondary copies can be stored in the same storage device as primary data 912 and/or other previously stored copies. For example, in one embodiment a disk array capable of performing hardware snapshots stores primary data 912 and creates and stores hardware snapshots of the primary data 912 as secondary copies 916. Secondary copies 916 may be stored in relatively slow and/or low cost storage (e.g., magnetic tape). A secondary copy 916 may be stored in a backup or archive format, or in some other format different than the native source application format or other primary data format.

In some cases, secondary copies 916 are indexed so users can browse and restore at another point in time. After creation of a secondary copy 916 representative of certain primary data 912, a pointer or other location indicia (e.g., a stub) may be placed in primary data 912, or be otherwise associated with primary data 912 to indicate the current location on the secondary storage device(s) 908.

Since an instance of a data object or metadata in primary data 912 may change over time as it is modified by an application 910 (or hosted service or the operating system), the information management system 900 may create and manage multiple secondary copies 916 of a particular data object or metadata, each representing the state of the data object in primary data 912 at a particular point in time. Moreover, since an instance of a data object in primary data 912 may eventually be deleted from the primary storage device 904 and the file system, the information management system 900 may continue to manage point-in-time representations of that data object, even though the instance in primary data 912 no longer exists.

For virtualized computing devices the operating system and other applications 910 of the client computing device(s) 902 may execute within or under the management of virtualization software (e.g., a VMM), and the primary storage device(s) 904 may comprise a virtual disk created on a physical storage device. The information management system 900 may create secondary copies 916 of the files or other data objects in a virtual disk file and/or secondary copies 916 of the entire virtual disk file itself (e.g., of an entire .vmdk file).

Secondary copies 916 may be distinguished from corresponding primary data 912 in a variety of ways, some of which will now be described. First, as discussed, secondary copies 916 can be stored in a different format (e.g., backup, archive, or other non-native format) than primary data 912. For this or other reasons, secondary copies 916 may not be directly useable by the applications 910 of the client computing device 902, e.g., via standard system calls or otherwise without modification, processing, or other intervention by the information management system 900.

Secondary copies 916 are also in some embodiments stored on a secondary storage device 908 that is inaccessible to the applications 910 running on the client computing devices 902 (and/or hosted services). Some secondary copies 916 may be "offline copies," in that they are not readily available (e.g., not mounted to tape or disk). Offline copies can include copies of data that the information management system 900 can access without human intervention (e.g., tapes within an automated tape library, but not yet mounted in a drive), and copies that the information management system 900 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 902 continually generating large volumes of primary data 912 to be protected. Also, there can be significant overhead involved in the creation of secondary copies 916. Moreover, secondary storage devices 908 may be special purpose components, and interacting with them can require specialized intelligence.

In some cases, the client computing devices 902 interact directly with the secondary storage device 908 to create the secondary copies 916. However, in view of the factors described above, this approach can negatively impact the ability of the client computing devices 902 to serve the applications 910 and produce primary data 912. Further, the client computing devices 902 may not be optimized for interaction with the secondary storage devices 908.

Thus, in some embodiments, the information management system 900 includes one or more software and/or hardware components which generally act as intermediaries between the client computing devices 902 and the secondary storage devices 908. In addition to off-loading certain responsibilities from the client computing devices 902, these intermediate components can provide other benefits. For instance, as discussed further below with respect to FIG. 9D, distributing some of the work involved in creating secondary copies 916 can enhance scalability.

The intermediate components can include one or more secondary storage computing devices 906 as shown in FIG. 9A and/or one or more media agents, which can be software modules residing on corresponding secondary storage computing devices 906 (or other appropriate devices). Media agents are discussed below (e.g., with respect to FIGS. 9C-9E).

The secondary storage computing device(s) 906 can comprise any of the computing devices described above, without limitation. In some cases, the secondary storage computing device(s) 906 include specialized hardware and/or software componentry for interacting with the secondary storage devices 908.

To create a secondary copy 916 involving the copying of data from the primary storage subsystem 917 to the secondary storage subsystem 918, the client computing device 902 in some embodiments communicates the primary data 912 to be copied (or a processed version thereof) to the designated secondary storage computing device 906, via the communication pathway 914. The secondary storage computing device 906 in turn conveys the received data (or a processed version thereof) to the secondary storage device 908. In some such configurations, the communication pathway 914 between the client computing device 902 and the secondary storage computing device 906 comprises a portion of a LAN, WAN or SAN. In other cases, at least some client computing devices 902 communicate directly with the secondary storage devices 908 (e.g., via Fibre Channel or SCSI connections). In some other cases, one or more secondary copies 916 are created from existing secondary copies, such as in the case of an auxiliary copy operation, described in greater detail below.

Exemplary Primary Data and an Exemplary Secondary Copy

Figure 9B:
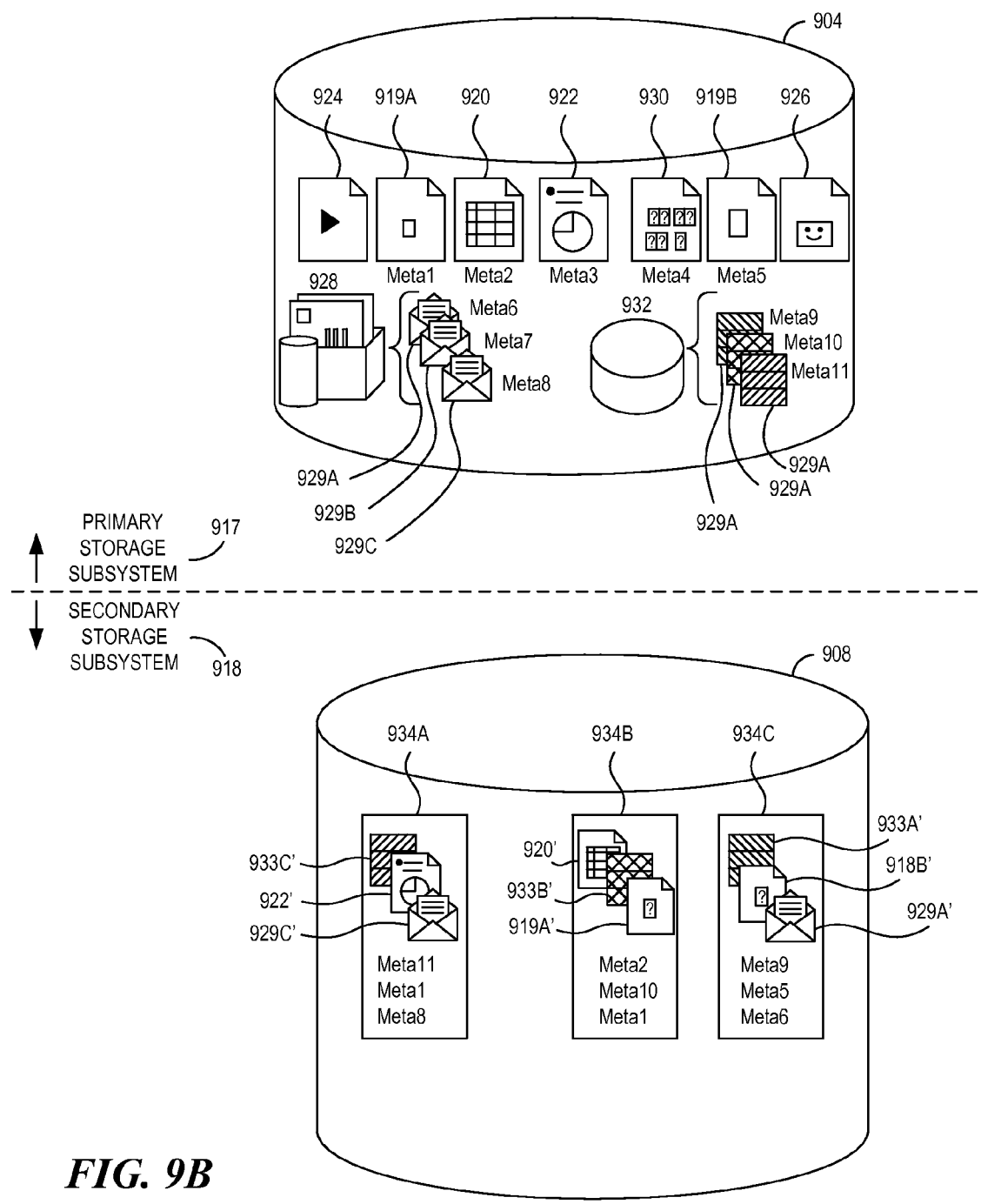
FIG. 9B is a detailed view of a primary storage device, a secondary storage device, and some examples of primary data and secondary copy data.

FIG. 9B is a detailed view showing some specific examples of primary data stored on the primary storage device(s) 904 and secondary copy data stored on the secondary storage device(s) 908, with other components in the system removed for the purposes of illustration. Stored on the primary storage device(s) 904 are primary data objects including word processing documents 919A-B, spreadsheets 920, presentation documents 922, video files 924, image files 926, email mailboxes 928 (and corresponding email messages 929A-C), html/xml or other types of markup language files 930, databases 932 and corresponding tables or other data structures 933A-933C).

Some or all primary data objects are associated with corresponding metadata (e.g., "Meta1-11"), which may include file system metadata and/or application specific metadata. Stored on the secondary storage device(s) 908 are secondary copy data objects 934A-C which may include copies of or otherwise represent corresponding primary data objects and metadata.

As shown, the secondary copy data objects 934A-C can individually represent more than one primary data object. For example, secondary copy data object 934A represents three separate primary data objects 933C, 922 and 929C (represented as 933C', 922' and 929C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 934B represents primary data objects 920, 933B, and 919A as 920', 933B', and 919A', respectively and accompanied by corresponding metadata Meta2, Meta10, and Meta1, respectively. Also, secondary data object 934C represents primary data objects 933A, 919B, and 929A as 933A', 919B', and 929A', respectively, accompanied by corresponding metadata Meta9, Meta5, and Meta6, respectively.

Exemplary Information Management System Architecture

The information management system 900 can incorporate a variety of different hardware and software components, which can in turn be organized with respect to one another in many different configurations, depending on the embodiment. There are critical design choices involved in specifying the functional responsibilities of the components and the role of each component in the information management system 900. For instance, as will be discussed, such design choices can impact performance as well as the adaptability of the information management system 900 to data growth or other changing circumstances.

Figure 9C:
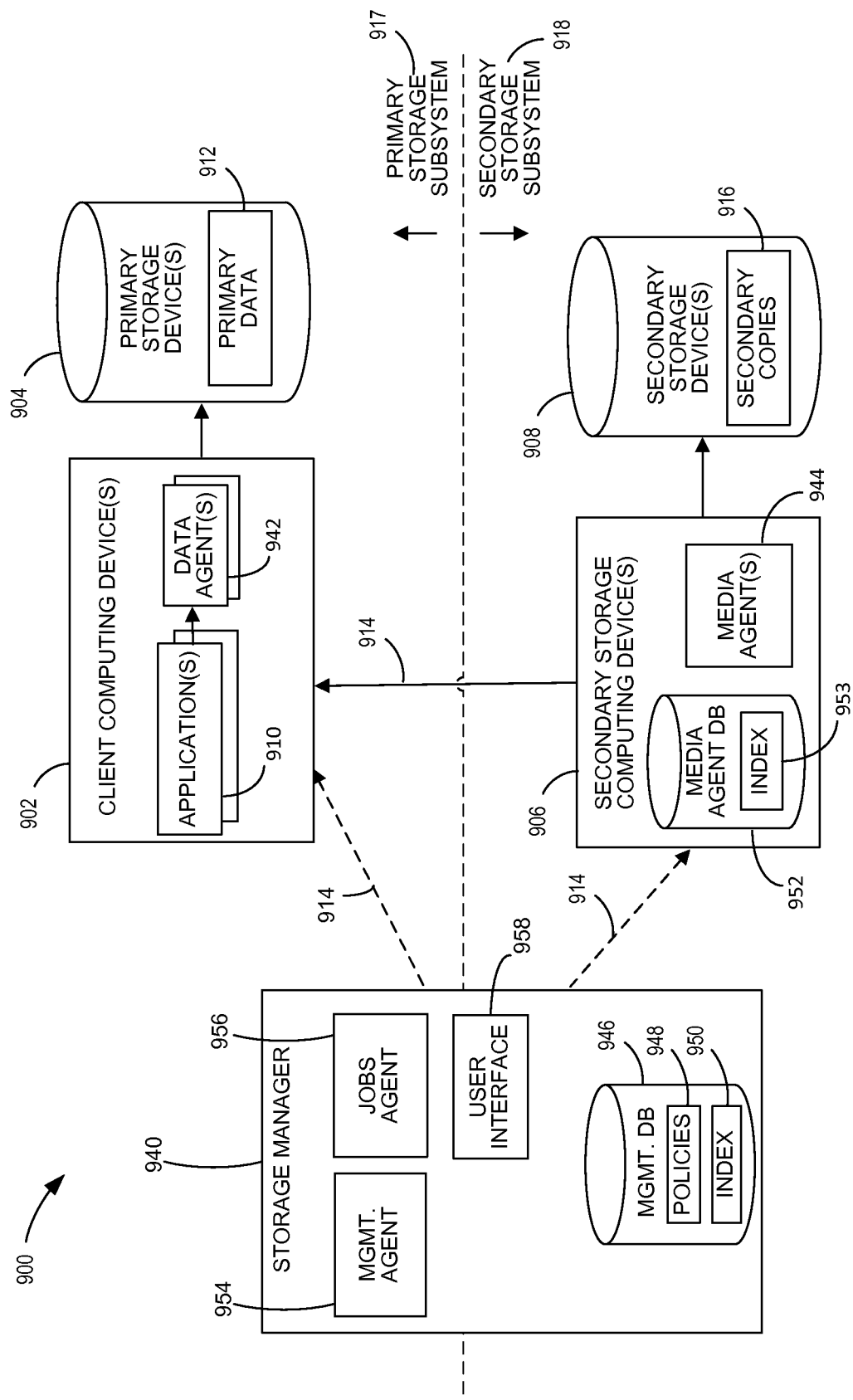
FIG. 9C is a block diagram of an information management system including a storage manager, one or more data agents, and one or more media agents.

FIG. 9C shows an information management system 900 designed according to these considerations and which includes: storage manager 940, a centralized storage and/or information manager that is configured to perform certain control functions, one or more data agents 942 executing on the client computing device(s) 902 configured to process primary data 912, and one or more media agents 944 executing on the one or more secondary storage computing devices 906 for performing tasks involving the secondary storage devices 908. While distributing functionality amongst multiple computing devices can have certain advantages, in other contexts it can be beneficial to consolidate functionality on the same computing device. As such, in various other embodiments, one or more of the components shown in FIG. 9C as being implemented on separate computing devices are implemented on the same computing device. In one configuration, a storage manager 940, one or more data agents 942, and one or more media agents 944 are all implemented on the same computing device. In another embodiment, one or more data agents 942 and one or more media agents 944 are implemented on the same computing device, while the storage manager 940 is implemented on a separate computing device.

Storage Manager

As noted, the number of components in the information management system 900 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 900, or at least a significant portion of that responsibility, is allocated to the storage manager 940.

By distributing control functionality in this manner, the storage manager 940 can be adapted independently according to changing circumstances. Moreover, a computing device for hosting the storage manager 940 can be selected to best suit the functions of the storage manager 940. These and other advantages are described in further detail below with respect to FIG. 9D.

The storage manager 940 may be a software module or other application. In some embodiments, storage manager 940 is a computing device comprising circuitry for executing computer instructions and performs the functions described herein. The storage manager generally initiates, performs, coordinates and/or controls storage and other information management operations performed by the information management system 900, e.g., to protect and control the primary data 912 and secondary copies 916 of data and metadata.

As shown by the dashed arrowed lines 914, the storage manager 940 may communicate with and/or control some or all elements of the information management system 900, such as the data agents 942 and media agents 944. Thus, in certain embodiments, control information originates from the storage manager 940, whereas payload data and payload metadata is generally communicated between the data agents 942 and the media agents 944 (or otherwise between the client computing device(s) 902 and the secondary storage computing device(s) 906), e.g., at the direction of the storage manager 940. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 908 in a secondary copy operation. Payload metadata can include any of the types of metadata described herein, and may be written to a storage device along with the payload content data (e.g., in the form of a header).

In other embodiments, some information management operations are controlled by other components in the information management system 900 (e.g., the media agent(s) 944 or data agent(s) 942), instead of or in combination with the storage manager 940.

According to certain embodiments, the storage manager 940 provides one or more of the following functions:
  initiating execution of secondary copy operations;
  managing secondary storage devices 908 and inventory/capacity of the same;
  reporting, searching, and/or classification of data in the information management system 900;
  allocating secondary storage devices 908 for secondary storage operations;
  monitoring completion of and providing status reporting related to secondary storage operations;
  tracking age information relating to secondary copies 916, secondary storage devices 908, and comparing the age information against retention guidelines;
  tracking movement of data within the information management system 900;
  tracking logical associations between components in the information management system 900;
  protecting metadata associated with the information management system 900; and
  implementing operations management functionality.

The storage manager 940 may maintain a database 946 (or "storage manager database 946" or "management database 946") of management-related data and information management policies 948. The database 946 may include a management index 950 (or "index 950") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 940 may use the index 950 to track logical associations between media agents 944 and secondary storage devices 908 and/or movement of data from primary storage devices 904 to secondary storage devices 908. For instance, the index 950 may store data associating a client computing device 902 with a particular media agent 944 and/or secondary storage device 908, as specified in an information management policy 948 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 900 may utilize information management policies 948 for specifying and executing information management operations (e.g., on an automated basis). Generally, an information management policy 948 can include a data structure or other information source that specifies a set of parameters (e.g., criteria and rules) associated with storage or other information management operations.

The storage manager database 946 may maintain the information management policies 948 and associated data, although the information management policies 948 can be stored in any appropriate location. For instance, an information management policy 948 such as a storage policy may be stored as metadata in a media agent database 952 or in a secondary storage device 908 (e.g., as an archive copy) for use in restore operations or other information management operations, depending on the embodiment. Information management policies 948 are described further below.

According to certain embodiments, the storage manager database 946 comprises a relational database (e.g., an SQL database) for tracking metadata, such as metadata associated with secondary copy operations (e.g., what client computing devices 902 and corresponding data were protected). This and other metadata may additionally be stored in other locations, such as at the secondary storage computing devices 906 or on the secondary storage devices 908, allowing data recovery without the use of the storage manager 940.

As shown, the storage manager 940 may include a jobs agent 956, a user interface 958, and a management agent 954, all of which may be implemented as interconnected software modules or application programs.

The jobs agent 956 in some embodiments initiates, controls, and/or monitors the status of some or all storage or other information management operations previously performed, currently being performed, or scheduled to be performed by the information management system 900. For instance, the jobs agent 956 may access information management policies 948 to determine when and how to initiate and control secondary copy and other information management operations, as will be discussed further.

The user interface 958 may include information processing and display software, such as a graphical user interface ("GUI"), an application program interface ("API"), or other interactive interface(s) through which users and system processes can retrieve information about the status of information management operations (e.g., storage operations) or issue instructions to the information management system 900 and its constituent components.

Via the user interface 958, users may optionally issue instructions to the components in the information management system 900 regarding performance of storage and recovery operations. For example, a user may modify a schedule concerning the number of pending secondary copy operations. As another example, a user may employ the GUI to view the status of pending storage operations or to monitor the status of certain components in the information management system 900 (e.g., the amount of capacity left in a storage device).

An information management "cell" may generally include a logical and/or physical grouping of a combination of hardware and software components associated with performing information management operations on electronic data, typically one storage manager 940 and at least one client computing device 902 (comprising data agent(s) 942) and at least one media agent 944. For instance, the components shown in FIG. 9C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 940 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 958. In general, the management agent 954 allows multiple information management cells to communicate with one another. For example, the information management system 900 in some cases may be one information management cell of a network of multiple cells adjacent to one another or otherwise logically related in a WAN or LAN. With this arrangement, the cells may be connected to one another through respective management agents 954.

For instance, the management agent 954 can provide the storage manager 940 with the ability to communicate with other components within the information management system 900 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 910 can reside on a given client computing device 902, including operating systems, database applications, e-mail applications, and virtual machines, just to name a few. And, as part of the process of creating and restoring secondary copies 916, the client computing devices 902 may be tasked with processing and preparing the primary data 912 from these various different applications 910. Moreover, the nature of the processing/preparation can differ across clients and application types, e.g., due to inherent structural and formatting differences between applications 910.

The one or more data agent(s) 942 are therefore advantageously configured in some embodiments to assist in the performance of information management operations based on the type of data that is being protected, at a client-specific and/or application-specific level.

The data agent 942 may be a software module or component that is generally responsible for managing, initiating, or otherwise assisting in the performance of information management operations. For instance, the data agent 942 may take part in performing data storage operations such as the copying, archiving, migrating, replicating of primary data 912 stored in the primary storage device(s) 904. The data agent 942 may receive control information from the storage manager 940, such as commands to transfer copies of data objects, metadata, and other payload data to the media agents 944.

In some embodiments, a data agent 942 may be distributed between the client computing device 902 and storage manager 940 (and any other intermediate components) or may be deployed from a remote location or its functions approximated by a remote process that performs some or all of the functions of data agent 942. In addition, a data agent 942 may perform some functions provided by a media agent 944, or may perform other functions such as encryption and deduplication.

As indicated, each data agent 942 may be specialized for a particular application 910, and the system can employ multiple application-specific data agents 942, each of which may perform information management operations (e.g., perform backup, migration, and data recovery) associated with a different application 910. For instance, different individual data agents 942 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 902 has two or more types of data, one data agent 942 may be used for each data type to copy, archive, migrate, and restore the client computing device 902 data. For example, to backup, migrate, and restore all of the data on a Microsoft Exchange server, the client computing device 902 may use one Microsoft Exchange Mailbox data agent 942 to backup the Exchange mailboxes, one Microsoft Exchange Database data agent 942 to backup the Exchange databases, one Microsoft Exchange Public Folder data agent 942 to backup the Exchange Public Folders, and one Microsoft Windows File System data agent 942 to backup the file system of the client computing device 902. In such embodiments, these data agents 942 may be treated as four separate data agents 942 even though they reside on the same client computing device 902.

Other embodiments may employ one or more generic data agents 942 that can handle and process data from two or more different applications 910, or that can handle and process multiple data types, instead of or in addition to using specialized data agents 942. For example, one generic data agent 942 may be used to back up, migrate and restore Microsoft Exchange Mailbox data and Microsoft Exchange Database data while another generic data agent may handle Microsoft Exchange Public Folder data and Microsoft Windows File System data.

Each data agent 942 may be configured to access data and/or metadata stored in the primary storage device(s) 904 associated with the data agent 942 and process the data as appropriate. For example, during a secondary copy operation, the data agent 942 may arrange or assemble the data and metadata into one or more files having a certain format (e.g., a particular backup or archive format) before transferring the file(s) to a media agent 944 or other component. The file(s) may include a list of files or other metadata. Each data agent 942 can also assist in restoring data or metadata to primary storage devices 904 from a secondary copy 916. For instance, the data agent 942 may operate in conjunction with the storage manager 940 and one or more of the media agents 944 to restore data from secondary storage device(s) 908.

Media Agents

As indicated above with respect to FIG. 9A, off-loading certain responsibilities from the client computing devices 902 to intermediate components such as the media agent(s) 944 can provide a number of benefits including improved client computing device 902 operation, faster secondary copy operation performance, and enhanced scalability. As one specific example which will be discussed below in further detail, the media agent 944 can act as a local cache of copied data and/or metadata that it has stored to the secondary storage device(s) 908, providing improved restore capabilities.

Generally speaking, a media agent 944 may be implemented as a software module that manages, coordinates, and facilitates the transmission of data, as directed by the storage manager 940, between a client computing device 902 and one or more secondary storage devices 908. Whereas the storage manager 940 controls the operation of the information management system 900, the media agent 944 generally provides a portal to secondary storage devices 908. For instance, other components in the system interact with the media agents 944 to gain access to data stored on the secondary storage devices 908, whether it be for the purposes of reading, writing, modifying, or deleting data. Moreover, as will be described further, media agents 944 can generate and store information relating to characteristics of the stored data and/or metadata, or can generate and store other types of information that generally provides insight into the contents of the secondary storage devices 908.

Media agents 944 can comprise separate nodes in the information management system 900 (e.g., nodes that are separate from the client computing devices 902, storage manager 940, and/or secondary storage devices 908). In general, a node within the information management system 900 can be a logically and/or physically separate component, and in some cases is a component that is individually addressable or otherwise identifiable. In addition, each media agent 944 may reside on a dedicated secondary storage computing device 906 in some cases, while in other embodiments a plurality of media agents 944 reside on the same secondary storage computing device 906.

A media agent 944 (and corresponding media agent database 952) may be considered to be "associated with" a particular secondary storage device 908 if that media agent 944 is capable of one or more of: routing and/or storing data to the particular secondary storage device 908, coordinating the routing and/or storing of data to the particular secondary storage device 908, retrieving data from the particular secondary storage device 908, coordinating the retrieval of data from a particular secondary storage device 908, and modifying and/or deleting data retrieved from the particular secondary storage device 908.

While media agent(s) 944 are generally associated with one or more secondary storage devices 908, one or more media agents 944 in certain embodiments are physically separate from the secondary storage devices 908. For instance, the media agents 944 may reside on secondary storage computing devices 906 having different housings or packages than the secondary storage devices 908. In one example, a media agent 944 resides on a first server computer and is in communication with a secondary storage device(s) 908 residing in a separate, rack-mounted RAID-based system.

Where the information management system 900 includes multiple media agents 944 (FIG. 9D), a first media agent 944 may provide failover functionality for a second, failed media agent 944. In addition, media agents 944 can be dynamically selected for storage operations to provide load balancing. Failover and load balancing are described in greater detail below.

In operation, a media agent 944 associated with a particular secondary storage device 908 may instruct the secondary storage device 908 to perform an information management operation. For instance, a media agent 944 may instruct a tape library to use a robotic arm or other retrieval means to load or eject a certain storage media, and to subsequently archive, migrate, or retrieve data to or from that media, e.g., for the purpose of restoring the data to a client computing device 902. As another example, a secondary storage device 908 may include an array of hard disk drives or solid state drives organized in a RAID configuration, and the media agent 944 may forward a logical unit number (LUN) and other appropriate information to the array, which uses the received information to execute the desired storage operation. The media agent 944 may communicate with a secondary storage device 908 via a suitable communications link, such as a SCSI or Fiber Channel link.

As shown, each media agent 944 may maintain an associated media agent database 952. The media agent database 952 may be stored in a disk or other storage device (not shown) that is local to the secondary storage computing device 906 on which the media agent 944 resides. In other cases, the media agent database 952 is stored remotely from the secondary storage computing device 906.

The media agent database 952 can include, among other things, an index 953 including data generated during secondary copy operations and other storage or information management operations. The index 953 provides a media agent 944 or other component with a fast and efficient mechanism for locating secondary copies 916 or other data stored in the secondary storage devices 908. In some cases, the index 953 does not form a part of and is instead separate from the media agent database 952.

A media agent index 953 or other data structure associated with the particular media agent 944 may include information about the stored data. For instance, for each secondary copy 916, the index 953 may include metadata such as a list of the data objects (e.g., files/subdirectories, database objects, mailbox objects, etc.), a path to the secondary copy 916 on the corresponding secondary storage device 908, location information indicating where the data objects are stored in the secondary storage device 908, when the data objects were created or modified, etc. Thus, the index 953 includes metadata associated with the secondary copies 916 that is readily available for use in storage operations and other activities without having to be first retrieved from the secondary storage device 908. In yet further embodiments, some or all of the data in the index 953 may instead or additionally be stored along with the data in a secondary storage device 908, e.g., with a copy of the index 953. In some embodiments, the secondary storage devices 908 can include sufficient information to perform a "bare metal restore", where the operating system of a failed client computing device 902 or other restore target is automatically rebuilt as part of a restore operation.

Because the index 953 maintained in the media agent database 952 may operate as a cache, it can also be referred to as "an index cache." In such cases, information stored in the index cache 953 typically comprises data that reflects certain particulars about storage operations that have occurred relatively recently. After some triggering event, such as after a certain period of time elapses, or the index cache 953 reaches a particular size, the index cache 953 may be copied or migrated to a secondary storage device(s) 908. This information may need to be retrieved and uploaded back into the index cache 953 or otherwise restored to a media agent 944 to facilitate retrieval of data from the secondary storage device(s) 908. In some embodiments, the cached information may include format or containerization information related to archives or other files stored on the storage device(s) 908. In this manner, the index cache 953 allows for accelerated restores.

In some alternative embodiments the media agent 944 generally acts as a coordinator or facilitator of storage operations between client computing devices 902 and corresponding secondary storage devices 908, but does not actually write the data to the secondary storage device 908. For instance, the storage manager 940 (or the media agent 944) may instruct a client computing device 902 and secondary storage device 908 to communicate with one another directly. In such a case the client computing device 902 transmits the data directly or via one or more intermediary components to the secondary storage device 908 according to the received instructions, and vice versa. In some such cases, the media agent 944 may still receive, process, and/or maintain metadata related to the storage operations. Moreover, in these embodiments, the payload data can flow through the media agent 944 for the purposes of populating the index cache 953 maintained in the media agent database 952, but not for writing to the secondary storage device 908.

The media agent 944 and/or other components such as the storage manager 940 may in some cases incorporate additional functionality, such as data classification, content indexing, deduplication, encryption, compression, and the like. Further details regarding these and other functions are described below.

Distributed, Scalable Architecture

As described, certain functions of the information management system 900 can be distributed amongst various physical and/or logical components in the system. For instance, one or more of the storage manager 940, data agents 942, and media agents 944 may reside on computing devices that are physically separate from one another. This architecture can provide a number of benefits.

For instance, hardware and software design choices for each distributed component can be targeted to suit its particular function. The secondary computing devices 906 on which the media agents 944 reside can be tailored for interaction with associated secondary storage devices 908 and provide fast index cache operation, among other specific tasks. Similarly, the client computing device(s) 902 can be selected to effectively service the applications 910 residing thereon, in order to efficiently produce and store primary data 912.

Moreover, in some cases, one or more of the individual components in the information management system 900 can be distributed to multiple, separate computing devices. As one example, for large file systems where the amount of data stored in the database 946 is relatively large, the database 946 may be migrated to or otherwise reside on a specialized database server (e.g., an SQL server) separate from a server that implements the other functions of the storage manager 940. This configuration can provide added protection because the database 946 can be protected with standard database utilities (e.g., SQL log shipping or database replication) independent from other functions of the storage manager 940. The database 946 can be efficiently replicated to a remote site for use in the event of a disaster or other data loss incident at the primary site. Or the database 946 can be replicated to another computing device within the same site, such as to a higher performance machine in the event that a storage manager host device can no longer service the needs of a growing information management system 900.

Figure 9D:
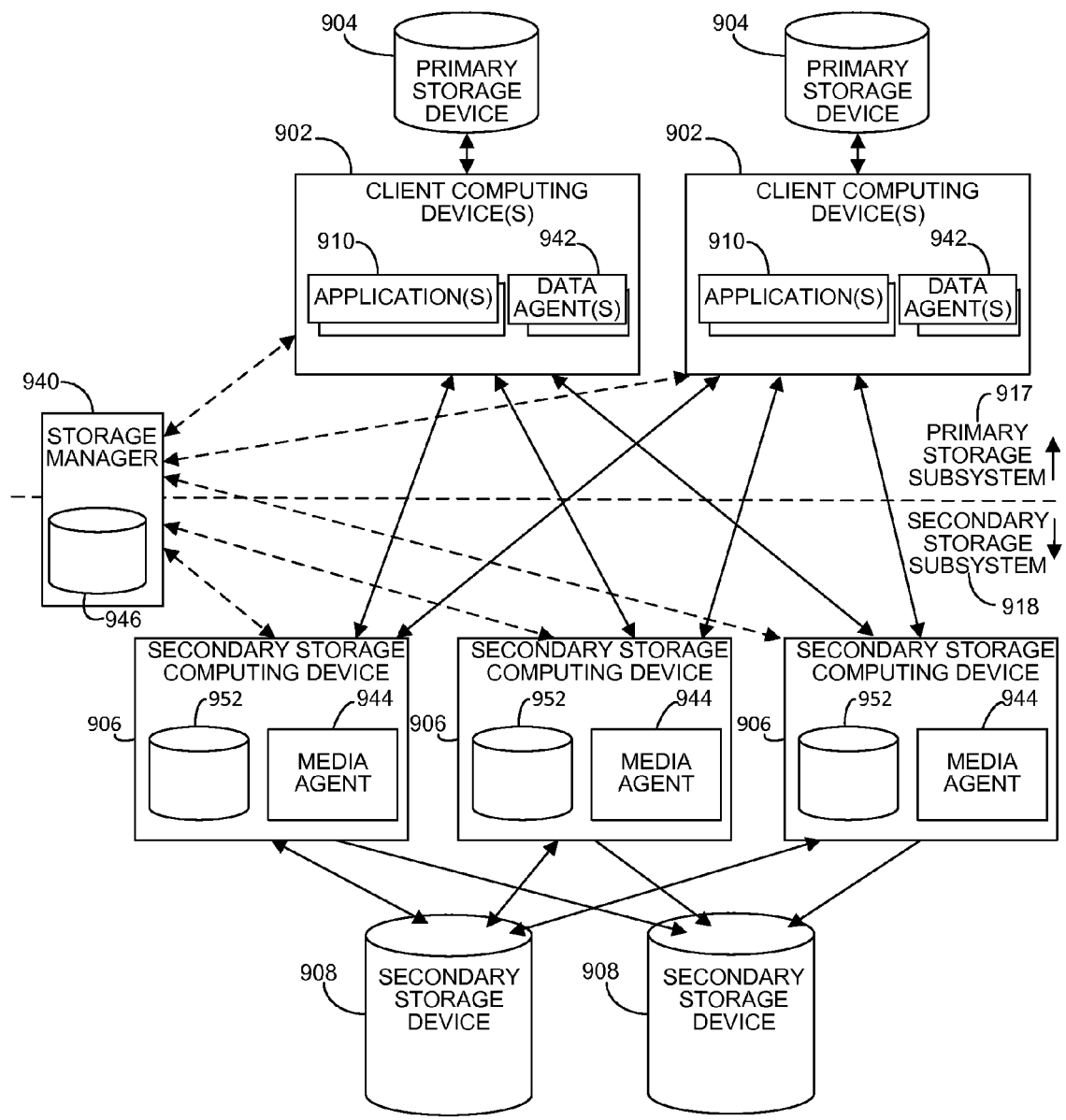
FIG. 9D is a block diagram illustrating a scalable information management system.

The distributed architecture also provides both scalability and efficient component utilization. FIG. 9D shows an embodiment of the information management system 900 including a plurality of client computing devices 902 and associated data agents 942 as well as a plurality of secondary storage computing devices 906 and associated media agents 944.

Additional components can be added or subtracted based on the evolving needs of the information management system 900. For instance, depending on where bottlenecks are identified, administrators can add additional client computing devices 902, secondary storage computing devices 906 (and corresponding media agents 944), and/or secondary storage devices 908. Moreover, where multiple fungible components are available, load balancing can be implemented to dynamically address identified bottlenecks. As an example, the storage manager 940 may dynamically select which media agents 944 and/or secondary storage devices 908 to use for storage operations based on a processing load analysis of the media agents 944 and/or secondary storage devices 908, respectively.

Moreover, each client computing device 902 in some embodiments can communicate with, among other components, any of the media agents 944, e.g., as directed by the storage manager 940. And each media agent 944 may be able to communicate with, among other components, any of the secondary storage devices 908, e.g., as directed by the storage manager 940. Thus, operations can be routed to the secondary storage devices 908 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 942 and the storage manager 940 reside on the same client computing device 902. In another embodiment, one or more data agents 942 and one or more media agents 944 reside on a single computing device.

Exemplary Types of Information Management Operations

In order to protect and leverage stored data, the information management system 900 can be configured to perform a variety of information management operations. As will be described, these operations can generally include secondary copy and other data movement operations, processing and data manipulation operations, analysis, reporting, and management operations. The operations described herein may be performed on any type of computing platform, e.g., between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 900 in an original/native and/or one or more different formats. For example, data movement operations can include operations in which stored data is copied, migrated, or otherwise transferred from one or more first storage devices to one or more second storage devices, such as from primary storage device(s) 904 to secondary storage device(s) 908, from secondary storage device(s) 908 to different secondary storage device(s) 908, from secondary storage devices 908 to primary storage devices 904, or from primary storage device(s) 904 to different primary storage device(s) 904.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 912 at a particular point in time. Each subsequent backup copy may be maintained independently of the first. Further, a backup copy in some embodiments is generally stored in a form that is different than the native format, e.g., a backup format. This can be in contrast to the version in primary data 912 from which the backup copy is derived, and which may instead be stored in a native format of the source application(s) 910. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 912, and may be stored on media with slower retrieval times than primary data 912 and certain other types of secondary copies 916. On the other hand, backups may have relatively shorter retention periods than some other types of secondary copies 916, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 900 may generally track changes to individual files at the file-level, and includes copies of files in the backup copy. In the case of a block-level backup, files are broken into constituent blocks, and changes are tracked at the block-level. Upon restore, the information management system 900 reassembles the blocks into files in a transparent fashion.

Far less data may actually be transferred and copied to the secondary storage devices 908 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 912 and also maintaining backup copies in secondary storage device(s) 908, they can consume significant storage capacity. To help reduce storage consumption, an archive operation according to certain embodiments creates a secondary copy 916 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 912 or a secondary copy 916, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 912 is archived, in some cases the archived primary data 912 or a portion thereof is deleted when creating the archive copy. Thus, archiving can serve the purpose of freeing up space in the primary storage device(s) 904. Similarly, when a secondary copy 916 is archived, the secondary copy 916 may be deleted, and an archive copy can therefore serve the purpose of freeing up space in secondary storage device(s) 908. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 912 at a given point in time, and may include state and/or status information relative to an application that creates/manages the data. In one embodiment, a snapshot may generally capture the directory structure of an object in primary data 912 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 904 or a secondary storage device 908) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 900. In this manner, hardware snapshots can off-load other components of information management system 900 from processing involved in snapshot creation and management.

A "software snapshot" (or "software-based snapshot") operation, on the other hand, can be a snapshot operation in which one or more other components in information management system 900 (e.g., client computing devices 902, data agents 942, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 912 from a snapshot taken at a given point in time, users may also return the current file system to the state of the file system that existed when the snapshot was taken.

Replication Operations

Another type of secondary copy operation is a replication operation. Some types of secondary copies 916 are used to periodically capture images of primary data 912 at particular points in time (e.g., backups, archives, and snapshots). However, it can also be useful for recovery purposes to protect primary data 912 in a more continuous fashion, by replicating the primary data 912 substantially as changes occur. In some cases a replication copy can be a mirror copy, for instance, where changes made to primary data 912 are mirrored or substantially immediately copied to another location (e.g., to secondary storage device(s) 908). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 912. This feature allows the system to directly access, copy, restore, backup or otherwise manipulate the replication copies as if the data was the "live", primary data 912. This can reduce access time, storage utilization, and impact on source applications 910, among other benefits.

Based on known good state information, the information management system 900 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 900 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 900 utilizes a technique for dynamically aligning deduplication blocks (e.g., fixed-length blocks) based on changing content in the data stream, as described in U.S. Pat. No. 8,364,652, which is incorporated by reference herein.

The information management system 900 can perform deduplication in a variety of manners at a variety of locations in the information management system 900. For instance, in some embodiments, the information management system 900 implements "target-side" deduplication by deduplicating data (e.g., secondary copies 916) stored in the secondary storage devices 908. In some such cases, the media agents 944 are generally configured to manage the deduplication process. For instance, one or more of the media agents 944 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 944 and the client computing device(s) 902 and/or reduce redundant data stored in the primary storage devices 904. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 940 may communicate with other components within the information management system 900 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 904 to secondary storage devices 908, or between tiers of secondary storage devices 908. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 912 or a secondary copy 916 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 904 (or other source storage device, such as a secondary storage device 908) to replace the deleted data in primary data 912 (or other source copy) and to point to or otherwise indicate the new location in a secondary storage device 908.

According to one example, files are generally moved between higher and lower cost storage depending on how often the files are accessed. When a user requests access to the HSM data that has been removed or migrated, the information management system 900 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 904). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 916. For instance, an initial secondary copy 916 may be generated using or otherwise be derived from primary data 912 (or other data residing in the secondary storage subsystem 918), whereas an auxiliary copy is generated from the initial secondary copy 916. Auxiliary copies can be used to create additional standby copies of data and may reside on different secondary storage devices 908 than the initial secondary copies 916. Thus, auxiliary copies can be used for recovery purposes if initial secondary copies 916 become unavailable. Exemplary compatible auxiliary copy techniques are described in further detail in U.S. Pat. No. 8,230,195, which is incorporated by reference herein.

The information management system 900 may also perform disaster recovery operations that make or retain disaster recovery copies, often as secondary, high-availability disk copies. The information management system 900 may create secondary disk copies and store the copies at disaster recovery locations using auxiliary copy or replication operations, such as continuous data replication technologies. Depending on the particular data protection goals, disaster recovery locations can be remote from the client computing devices 902 and primary storage devices 904, remote from some or all of the secondary storage devices 908, or both.

Data Analysis, Reporting, and Management Operations

Data analysis, reporting, and management operations can be different than data movement operations in that they do not necessarily involve the copying, migration or other transfer of data (e.g., primary data 912 or secondary copies 916) between different locations in the system. For instance, data analysis operations may involve processing (e.g., offline processing) or modification of already stored primary data 912 and/or secondary copies 916. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 900 analyzes and indexes characteristics, content, and metadata associated with the data stored within the primary data 912 and/or secondary copies 916, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 900 generally organizes and catalogues the results in a content index, which may be stored within the media agent database 952, for example. The content index can also include the storage locations of (or pointer references to) the indexed data in the primary data 912 or secondary copies 916, as appropriate. The results may also be stored, in the form of a content index database or otherwise, elsewhere in the information management system 900 (e.g., in the primary storage devices 904, or in the secondary storage device 908). Such index data provides the storage manager 940 or another component with an efficient mechanism for locating primary data 912 and/or secondary copies 916 of data objects that match particular criteria.

For instance, search criteria can be specified by a user through user interface 958 of the storage manager 940. In some cases, the information management system 900 analyzes data and/or metadata in secondary copies 916 to create an "off-line" content index, without significantly impacting the performance of the client computing devices 902. Depending on the embodiment, the system can also implement "on-line" content indexing, e.g., of primary data 912. Examples of compatible content indexing techniques are provided in U.S. Pat. No. 8,170,995, which is incorporated by reference herein.

In order to further leverage the data stored in the information management system 900 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 900. As an example, there may be a first centralized metabase associated with the primary storage subsystem 917 and a second centralized metabase associated with the secondary storage subsystem 918. In other cases, there may be one or more metabases associated with individual components. For instance, there may be a dedicated metabase associated with some or all of the client computing devices 902 and/or media agents 944. In some embodiments, a data classification database may reside as one or more data structures within management database 946, or may be otherwise associated with storage manager 940.

In some cases, the metabase(s) may be included in separate database(s) and/or on separate storage device(s) from primary data 912 and/or secondary copies 916, such that operations related to the metabase do not significantly impact performance on other components in the information management system 900. In other cases, the metabase(s) may be stored along with primary data 912 and/or secondary copies 916. Files or other data objects can be associated with identifiers (e.g., tag entries, etc.) in the media agent 944 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 900 in some cases is configured to process data (e.g., files or other data objects, secondary copies 916, etc.), according to an appropriate encryption algorithm (e.g., Blowfish, Advanced Encryption Standard [AES], Triple Data Encryption Standard [3-DES], etc.) to limit access and provide data security in the information management system 900.

The information management system 900 in some cases encrypts the data at the client level, such that the client computing devices 902 (e.g., the data agents 942) encrypt the data prior to forwarding the data to other components, e.g., before sending the data to media agents 944 during a secondary copy operation. In such cases, the client computing device 902 may maintain or have access to an encryption key or passphrase for decrypting the data upon restore. Encryption can also occur when creating copies of secondary copies, e.g., when creating auxiliary copies or archive copies. In yet further embodiments, the secondary storage devices 908 can implement built-in, high performance hardware encryption.

Management and Reporting Operations

Certain embodiments leverage the integrated, ubiquitous nature of the information management system 900 to provide useful system-wide management and reporting functions. Examples of some compatible management and reporting techniques are provided in U.S. Pat. No. 7,343, 453, which is incorporated by reference herein.

Operations management can generally include monitoring and managing the health and performance of information management system 900 by, without limitation, performing error tracking, generating granular storage/performance metrics (e.g., job success/failure information, deduplication efficiency, etc.), generating storage modeling and costing information, and the like.

As an example, a storage manager 940 or other component in the information management system 900 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 940 may track the status of a set of associated storage operation cells in a hierarchy of information management cells, such as the status of jobs, system components, system resources, and other items, by communicating with storage managers 940 (or other components) in the respective storage operation cells. Moreover, the master storage manager 940 may track the status of its associated storage operation cells and associated information management operations by receiving periodic status updates from the storage managers 940 (or other components) in the respective cells regarding jobs, system components, system resources, and other items. In some embodiments, a master storage manager 940 may store status information and other information regarding its associated storage operation cells and other system information in its index 950 (or other location).

The master storage manager 940 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 912 should be migrated to a secondary storage device 908 to free space on the primary storage device 904. Examples of the use of risk factors and other triggering criteria are described in U.S. Pat. No. 7,343,453, which is incorporated by reference herein.

In some embodiments, the system 900 may also determine whether a metric or other indication satisfies a particular storage criteria and, if so, perform an action. For example, as previously described, a storage policy or other definition might indicate that a storage manager 940 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 900 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 958 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 958 can include an option to show a "virtual view" of the system that graphically depicts the various components in the system using appropriate icons. As one example, the user interface 958 may provide a graphical depiction of one or more primary storage devices 904, the secondary storage devices 908, data agents 942 and/or media agents 944, and their relationship to one another in the information management system 900. The operations management functionality can facilitate planning and decision-making. For example, in some embodiments, a user may view the status of some or all jobs as well as the status of each component of the information management system 900. Users may then plan and make decisions based on this data. For instance, a user may view high-level information regarding storage operations for the information management system 900, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 900 can also be configured to perform system-wide e-discovery operations in some embodiments. In general, e-discovery operations provide a unified collection and search capability for data in the system, such as data stored in the secondary storage devices 908 (e.g., backups, archives, or other secondary copies 916). For example, the information management system 900 may construct and maintain a virtual repository for data stored in the information management system 900 that is integrated across source applications 910, different storage device types, etc. According to some embodiments, e-discovery utilizes other techniques described herein, such as data classification and/or content indexing.

Information Management Policies

As indicated previously, an information management policy 948 can include a data structure or other information source that specifies a set of parameters (e.g., criteria and rules) associated with secondary copy or other information management operations.

One type of information management policy 948 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 908 includes a group of disk libraries, the storage policy may specify a particular disk library for storing the sub-clients associated with the policy. As another example, where the secondary storage devices 908 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 908 or a media agent 944), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 944 for conveying data (e.g., one or more sub-clients) associated with the storage policy between the source (e.g., one or more host client computing devices 902) and destination (e.g., a particular target secondary storage device 908).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 948 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 902, and the like. In one configuration, a separate scheduling policy is maintained for particular logical groupings of data on a client computing device 902. The scheduling policy specifies that those logical groupings are to be moved to secondary storage devices 908 every hour according to storage policies associated with the respective sub-clients.

When adding a new client computing device 902, administrators can manually configure information management policies 948 and/or other settings, e.g., via the user interface 958. However, this can be an involved process resulting in delays, and it may be desirable to begin data protecting operations quickly.

Thus, in some embodiments, the information management system 900 automatically applies a default configuration to client computing device 902. As one example, when one or more data agent(s) 942 are installed on one or more client computing devices 902, the installation script may register the client computing device 902 with the storage manager 940, which in turn applies the default configuration to the new client computing device 902. In this manner, data protection operations can begin substantially immediately. The default configuration can include a default storage policy, for example, and can specify any appropriate information sufficient to begin data protection operations. This can include a type of data protection operation, scheduling information, a target secondary storage device 908, data path information (e.g., a particular media agent 944), and the like.

Other types of information management policies 948 are possible. For instance, the information management policies 948 can also include one or more audit or security policies. An audit policy is a set of preferences, rules and/or criteria that protect sensitive data in the information management system 900. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 904 instead. To facilitate this approval, the audit policy may further specify how a secondary storage computing device 906 or other system component should notify a reviewer that a sensitive object is slated for transfer.

In some implementations, the information management policies 948 may include one or more provisioning policies. A provisioning policy can include a set of preferences, priorities, rules, and/or criteria that specify how client computing devices 902 (or groups thereof) may utilize system resources, such as available storage on cloud storage and/or network bandwidth. A provisioning policy specifies, for example, data quotas for particular client computing devices 902 (e.g., a number of gigabytes that can be stored monthly, quarterly or annually). The storage manager 940 or other components may enforce the provisioning policy. For instance, the media agents 944 may enforce the policy when transferring data to secondary storage devices 908. If a client computing device 902 exceeds a quota, a budget for the client computing device 902 (or associated department) is adjusted accordingly or an alert may trigger.

While the above types of information management policies 948 have been described as separate policies, one or more of these can be generally combined into a single information management policy 948. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 948 may specify:

- schedules or other timing information, e.g., specifying when and/or how often to perform information management operations;
- the type of copy 916 (e.g., type of secondary copy) and/or copy format (e.g., snapshot, backup, archive, HSM, etc.);
- a location or a class or quality of storage for storing secondary copies 916 (e.g., one or more particular secondary storage devices 908);
- preferences regarding whether and how to encrypt, compress, deduplicate, or otherwise modify or transform secondary copies 916;
- which system components and/or network pathways (e.g., preferred media agents 944) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 912 and/or secondary copies 916 should be retained, e.g., in a particular class or tier of storage devices, or within the information management system 900.

Policies can additionally specify or depend on a variety of historical or current criteria that may be used to determine which rules to apply to a particular data object, system component, or information management operation, such as:

- frequency with which primary data 912 or a secondary copy 916 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 908);
- the identity of users, applications 910, client computing devices 902 and/or other computing devices that created, accessed, modified, or otherwise utilized primary data 912 or secondary copies 916;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 9E:
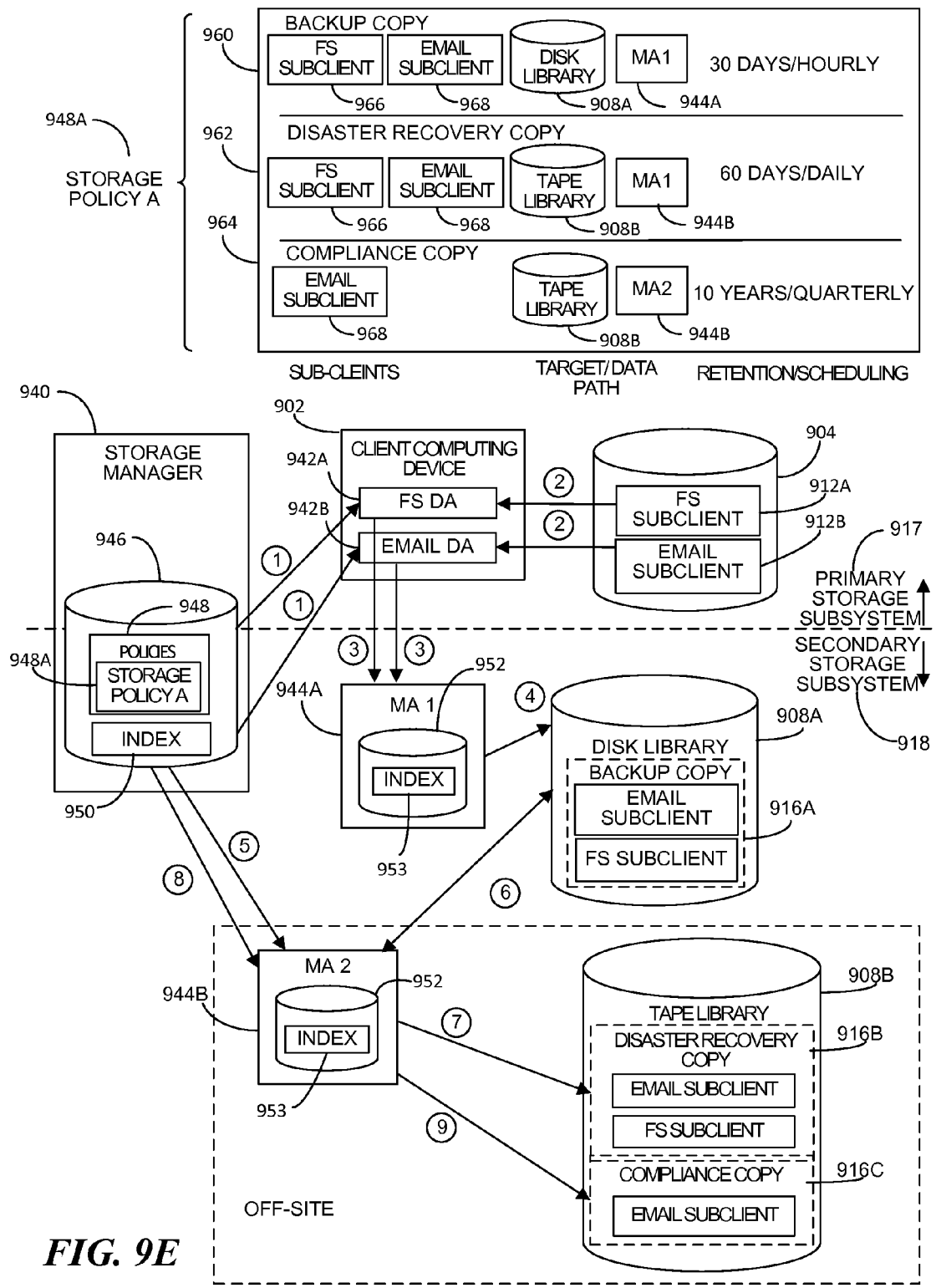
FIG. 9E illustrates certain secondary copy operations of a storage policy.

FIG. 9E shows a data flow data diagram depicting performance of storage operations by an embodiment of an information management system 900, according to an exemplary storage policy 948A. The information management system 900 includes a storage manger 940, a client computing device 902 having a file system data agent 942A and an email data agent 942B residing thereon, a primary storage device 904, two media agents 944A, 944B, and two secondary storage devices 908A, 908B: a disk library 908A and a tape library 908B. As shown, the primary storage device 904 includes primary data 912A, 912B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 9E can be utilized in conjunction with data that is organized in a variety of other manners.

As indicated by the dashed box, the second media agent 944B and the tape library 908B are "off-site", and may therefore be remotely located from the other components in the information management system 900 (e.g., in a different city, office building, etc.). Indeed, "off-site" may refer to a magnetic tape located in storage, which must be manually retrieved and loaded into a tape drive to be read. In this manner, information stored on the tape library 908B may provide protection in the event of a disaster or other failure.

The file system sub-client and its associated primary data 912A in certain embodiments generally comprise information generated by the file system and/or operating system of the client computing device 902, and can include, for example, file system data (e.g., regular files, file tables, mount points, etc.), operating system data (e.g., registries, event logs, etc.), and the like. The e-mail sub-client, on the other hand, and its associated primary data 912B, include data generated by an e-mail client application operating on the client computing device 902, and can include mailbox information, folder information, emails, attachments, associated database information, and the like. As described above, the sub-clients can be logical containers, and the data included in the corresponding primary data 912A, 912B may or may not be stored contiguously.

The exemplary storage policy 948A includes backup copy preferences or rule set 960, disaster recovery copy preferences rule set 962, and compliance copy preferences or rule set 964. The backup copy rule set 960 specifies that it is associated with a file system sub-client 966 and an email sub-client 968. Each of these sub-clients 966, 968 are associated with the particular client computing device 902. The backup copy rule set 960 further specifies that the backup operation will be written to the disk library 908A, and designates a particular media agent 944A to convey the data to the disk library 908A. Finally, the backup copy rule set 960 specifies that backup copies created according to the rule set 960 are scheduled to be generated on an hourly basis and to be retained for 30 days. In some other embodiments, scheduling information is not included in the storage policy 948A, and is instead specified by a separate scheduling policy.

The disaster recovery copy rule set 962 is associated with the same two sub-clients 966, 968. However, the disaster recovery copy rule set 962 is associated with the tape library 908B, unlike the backup copy rule set 960. Moreover, the disaster recovery copy rule set 962 specifies that a different media agent 944B than the media agent 944A associated with the backup copy rule set 960 will be used to convey the data to the tape library 908B. As indicated, disaster recovery copies created according to the rule set 962 will be retained for 60 days, and will be generated on a daily basis. Disaster recovery copies generated according to the disaster recovery copy rule set 962 can provide protection in the event of a disaster or other data-loss event that would affect the backup copy 916A maintained on the disk library 908A.

The compliance copy rule set 964 is only associated with the email sub-client 968, and not the file system sub-client 966. Compliance copies generated according to the compliance copy rule set 964 will therefore not include primary data 912A from the file system sub-client 966. For instance, the organization may be under an obligation to store and maintain copies of email data for a particular period of time (e.g., 10 years) to comply with state or federal regulations, while similar regulations do not apply to the file system data. The compliance copy rule set 964 is associated with the same tape library 908B and media agent 944B as the disaster recovery copy rule set 962, although a different storage device or media agent could be used in other embodiments. Finally, the compliance copy rule set 964 specifies that copies generated under the compliance copy rule set 964 will be retained for 10 years, and will be generated on a quarterly basis.

At step 1, the storage manager 940 initiates a backup operation according to the backup copy rule set 960. For instance, a scheduling service running on the storage manager 940 accesses scheduling information from the backup copy rule set 960 or a separate scheduling policy associated with the client computing device 902, and initiates a backup copy operation on an hourly basis. Thus, at the scheduled time slot the storage manager 940 sends instructions to the client computing device 902 to begin the backup operation.

At step 2, the file system data agent 942A and the email data agent 942B residing on the client computing device 902 respond to the instructions received from the storage manager 940 by accessing and processing the primary data 912A, 912B involved in the copy operation from the primary storage device 904. Because the operation is a backup copy operation, the data agent(s) 942A, 942B may format the data into a backup format or otherwise process the data.

At step 3, the client computing device 902 communicates the retrieved, processed data to the first media agent 944A, as directed by the storage manager 940, according to the backup copy rule set 960. In some other embodiments, the information management system 900 may implement a load-balancing, availability-based, or other appropriate algorithm to select from the available set of media agents 944A, 944B. Regardless of the manner the media agent 944A is selected, the storage manager 940 may further keep a record in the storage manager database 946 of the association between the selected media agent 944A and the client computing device 902 and/or between the selected media agent 944A and the backup copy 916A.

The target media agent 944A receives the data from the client computing device 902, and at step 4 conveys the data to the disk library 908A to create the backup copy 916A, again at the direction of the storage manager 940 and according to the backup copy rule set 960. The secondary storage device 908A can be selected in other ways. For instance, the media agent 944A may have a dedicated association with a particular secondary storage device(s), or the storage manager 940 or media agent 944A may select from a plurality of secondary storage devices, e.g., according to availability, using one of the techniques described in U.S. Pat. No. 7,246,207, which is incorporated by reference herein.

The media agent 944A can also update its index 953 to include data and/or metadata related to the backup copy 916A, such as information indicating where the backup copy 916A resides on the disk library 908A, data and metadata for cache retrieval, etc. After the 30 day retention period expires, the storage manager 940 instructs the media agent 944A to delete the backup copy 916A from the disk library 908A. The storage manager 940 may similarly update its index 950 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 940 may update its index 950 to include some or all of the information stored in the index 953 of the media agent 944A.

At step 5, the storage manager 940 initiates the creation of a disaster recovery copy 916B according to the disaster recovery copy rule set 962. For instance, at step 6, based on instructions received from the storage manager 940 at step 5, the specified media agent 944B retrieves the most recent backup copy 916A from the disk library 908A.

At step 7, again at the direction of the storage manager 940 and as specified in the disaster recovery copy rule set 962, the media agent 944B uses the retrieved data to create a disaster recovery copy 916B on the tape library 908B. In some cases, the disaster recovery copy 916B is a direct, mirror copy of the backup copy 916A, and remains in the backup format. In other embodiments, the disaster recovery copy 916B may be generated in some other manner, such as by using the primary data 912A, 912B from the primary storage device 904 as source data. The disaster recovery copy operation is initiated once a day and the disaster recovery copies 9168 are deleted after 60 days.

At step 8, the storage manager 940 initiates the creation of a compliance copy 916C, according to the compliance copy rule set 964. For instance, the storage manager 940 instructs the media agent 944B to create the compliance copy 916C on the tape library 908B at step 9, as specified in the compliance copy rule set 964. In the example, the compliance copy 916C is generated using the disaster recovery copy 916B. In other embodiments, the compliance copy 916C is instead generated using either the primary data 912B corresponding to the email sub-client or using the backup copy 916A from the disk library 908A as source data. As specified, in the illustrated example, compliance copies 916C are created quarterly, and are deleted after ten years.

While not shown in FIG. 9E, at some later point in time, a restore operation can be initiated involving one or more of the secondary copies 916A, 916B, 916C. As one example, a user may manually initiate a restore of the backup copy 916A by interacting with the user interface 958 of the storage manager 940. The storage manager 940 then accesses data in its index 950 (and/or the respective storage policy 948A) associated with the selected backup copy 916A to identify the appropriate media agent 944A and/or secondary storage device 908A.

In other cases, a media agent may be selected for use in the restore operation based on a load balancing algorithm, an availability based algorithm, or other criteria. The selected media agent 944A retrieves the data from the disk library 908A. For instance, the media agent 944A may access its index 953 to identify a location of the backup copy 916A on the disk library 908A, or may access location information residing on the disk 908A itself.

When the backup copy 916A was recently created or accessed, the media agent 944A accesses a cached version of the backup copy 916A residing in the index 953, without having to access the disk library 908A for some or all of the data. Once it has retrieved the backup copy 916A, the media agent 944A communicates the data to the source client computing device 902. Upon receipt, the file system data agent 942A and the email data agent 942B may unpackage (e.g., restore from a backup format to the native application format) the data in the backup copy 916A and restore the unpackaged data to the primary storage device 904.

Exemplary Applications of Storage Policies

The storage manager 940 may permit a user to specify aspects of the storage policy 948A. For example, the storage policy can be modified to include information governance policies to define how data should be managed in order to comply with a certain regulation or business objective. The various policies may be stored, for example, in the database 946. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 940 may execute cloud service provider API over a network to classify data stored on cloud storage devices.

Exemplary Secondary Copy Formatting

The formatting and structure of secondary copies 916 can vary, depending on the embodiment. In some cases, secondary copies 916 are formatted as a series of logical data units or "chunks" (e.g., 512 MB, 1 GB, 2 GB, 4 GB, or 8 GB chunks). This can facilitate efficient communication and writing to secondary storage devices 908, e.g., according to resource availability. For example, a single secondary copy 916 may be written on a chunk-by-chunk basis to a single secondary storage device 908 or across multiple secondary storage devices 908. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 944, storage manager 940, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 916 on the secondary storage device 908, the chunk headers can also be stored to the index 953 of the associated media agent(s) 944 and/or the index 950. This is useful in some cases for providing faster processing of secondary copies 916 during restores or other operations. In some cases, once a chunk is successfully transferred to a secondary storage device 908, the secondary storage device 908 returns an indication of receipt, e.g., to the media agent 944 and/or storage manager 940, which may update their respective indexes 953, 950 accordingly. During restore, chunks may be processed (e.g., by the media agent 944) according to the information in the chunk header to reassemble the files.

Data can also be communicated within the information management system 900 in data channels that connect the client computing devices 902 to the secondary storage devices 908. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

FIGS. 9F and 9G are diagrams of example data streams 970 and 971, respectively, which may be employed for performing data storage operations. Referring to FIG. 9F, the data agent 942 forms the data stream 970 from the data associated with a client computing device 902 (e.g., primary data 912). The data stream 970 is composed of multiple pairs of stream header 972 and stream data (or stream payload) 974. The data streams 970 and 971 shown in the illustrated example are for a single-instanced storage operation, and a stream payload 974 therefore may include both single-instance ("SI") data and/or non-SI data. A stream header 972 includes metadata about the stream payload 974. This metadata may include, for example, a length of the stream payload 974, an indication of whether the stream payload 974 is encrypted, an indication of whether the stream payload 974 is compressed, an archive file identifier (ID), an indication of whether the stream payload 974 is single instanceable, and an indication of whether the stream payload 974 is a start of a block of data.

Referring to FIG. 9G, the data stream 971 has the stream header 972 and stream payload 974 aligned into multiple data blocks. In this example, the data blocks are of size 64 KB. The first two stream header 972 and stream payload 974 pairs comprise a first data block of size 64 KB. The first stream header 972 indicates that the length of the succeeding stream payload 974 is 63 KB and that it is the start of a data block. The next stream header 972 indicates that the succeeding stream payload 974 has a length of 1 KB and that it is not the start of a new data block. Immediately following stream payload 974 is a pair comprising an identifier header 976 and identifier data 978. The identifier header 976 includes an indication that the succeeding identifier data 978 includes the identifier for the immediately previous data block. The identifier data 978 includes the identifier that the data agent 942 generated for the data block. The data stream 971 also includes other stream header 972 and stream payload 974 pairs, which may be for SI data and/or for non-SI data.

Figure 9H:
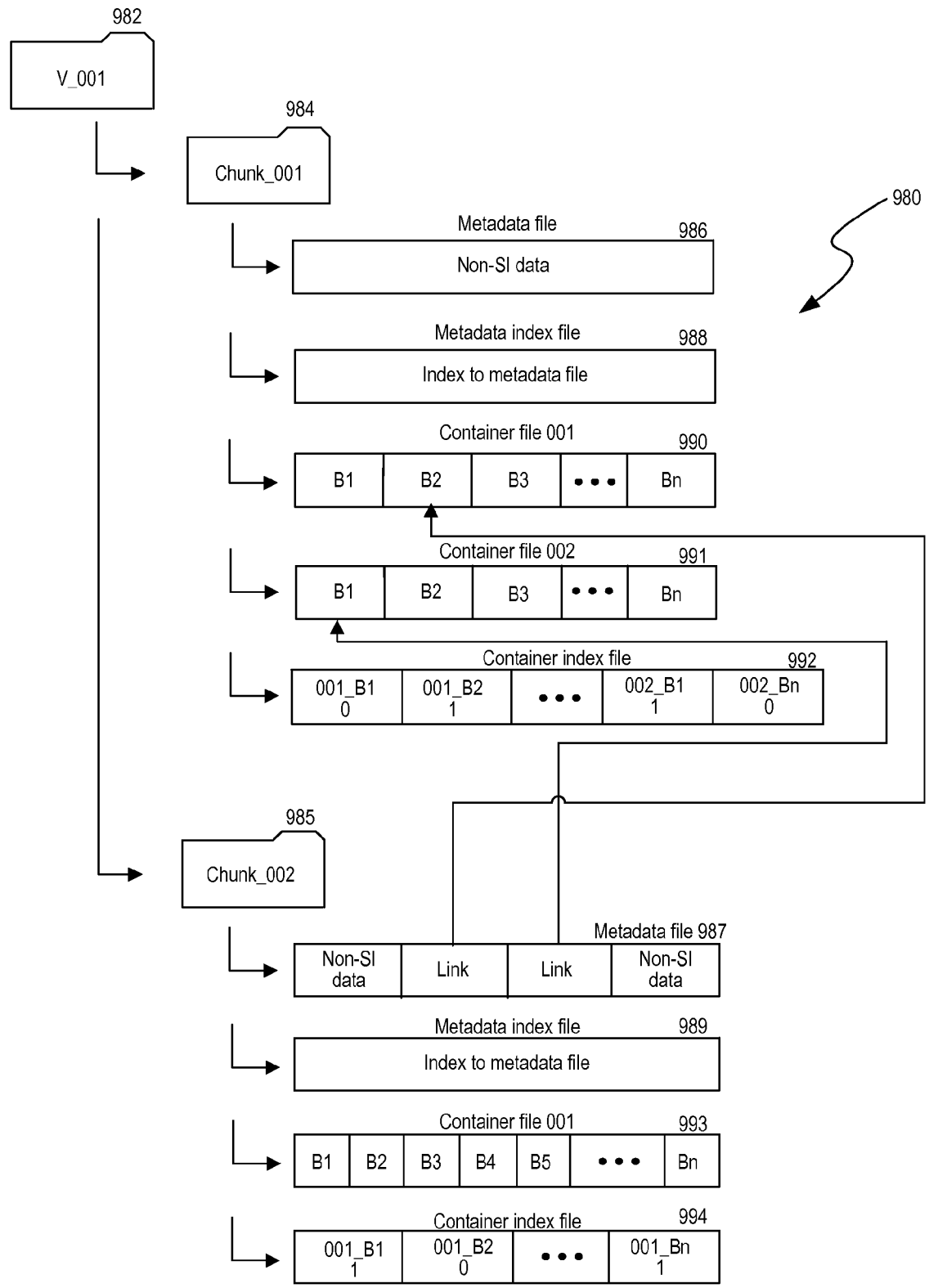

FIG. 9H is a diagram illustrating the data structures 980 that may be used to store blocks of SI data and non-SI data on the storage device (e.g., secondary storage device 908). According to certain embodiments, the data structures 980 do not form part of a native file system of the storage device. The data structures 980 include one or more volume folders 982, one or more chunk folders 984/985 within the volume folder 982, and multiple files within the chunk folder 984. Each chunk folder 984/985 includes a metadata file 986/987, a metadata index file 988/989, one or more container files 990/991/993, and a container index file 992/994. The metadata file 986/987 stores non-SI data blocks as well as links to SI data blocks stored in container files. The metadata index file 988/989 stores an index to the data in the metadata file 986/987. The container files 990/991/993 store SI data blocks. The container index file 992/994 stores an index to the container files 990/991/993. Among other things, the container index file 992/994 stores an indication of whether a corresponding block in a container file 990/991/993 is referred to by a link in a metadata file 986/987. For example, data block B2 in the container file 990 is referred to by a link in the metadata file 987 in the chunk folder 985. Accordingly, the corresponding index entry in the container index file 992 indicates that the data block B2 in the container file 990 is referred to. As another example, data block B1 in the container file 991 is referred to by a link in the metadata file 987, and so the corresponding index entry in the container index file 992 indicates that this data block is referred to.

As an example, the data structures 980 illustrated in FIG. 9H may have been created as a result of two storage operations involving two client computing devices 902. For example, a first storage operation on a first client computing device 902 could result in the creation of the first chunk folder 984, and a second storage operation on a second client computing device 902 could result in the creation of the second chunk folder 985. The container files 990/991 in the first chunk folder 984 would contain the blocks of SI data of the first client computing device 902. If the two client computing devices 902 have substantially similar data, the second storage operation on the data of the second client computing device 902 would result in the media agent 944 storing primarily links to the data blocks of the first client computing device 902 that are already stored in the container files 990/991. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 906 on which the media agent 944 resides supports sparse files, then when the media agent 944 creates container files 990/991/993, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 990/991/993 be sparse files allows the media agent 944 to free up space in the container files 990/991/993 when blocks of data in the container files 990/991/993 no longer need to be stored on the storage devices. In some examples, the media agent 944 creates a new container file 990/991/993 when a container file 990/991/993 either includes 100 blocks of data or when the size of the container file 990 exceeds 50 MB. In other examples, the media agent 944 creates a new container file 990/991/993 when a container file 990/991/993 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. §112(f) will begin with the words "means for", but use of the term "for" in any other context is not intended to invoke treatment under 35 U.S.C. §112(f). Accordingly, the applicant reserves the right to pursue additional claims after filing this application, in either this application or in a continuing application.

We claim:

1. A computer-implemented method for escalating an information management system alert in an information management system, the method comprising:
   receiving an indication of an information management system operation failure determining parameters of the information management system operation failure, wherein determining the parameters includes receiving:
      a type of information management system operation to be performed between a first computing device and a second computing device,
      a schedule time window for completion of the information management system operation, and
      a throughput estimation technique;
   estimating throughput between the first computing device and the second computing device,
      wherein throughput is a rate of transferring data per unit time between a storage device for the first computing device and a storage device for the second computing device,
   determining whether an information management system operation is completable within the schedule time window, including:
      estimating a size of data to be transferred between the first computing device and the second computing device to execute the received type of information management system operation,
      estimating a duration for the type of information management system operation based on the estimated size of data to be transferred and based on the estimated throughput between the first computing device and the second computing device, and
      comparing a duration of the schedule time window with the estimated duration for the type of information management system operation; and
      providing an information management system alert if the estimated duration for the type of information management system operation is greater than the duration of the schedule time window;
   determining whether a point of contact is available to address the information management system alert by querying directory services attributes for the point of contact, including querying, via an application programming interface (API) of a directory services application, the directory services attributes for a current status of the point of contact,
      wherein a point of contact is available when the directory services attributes indicate the current status of the point of contact is on a telephone call or not in a meeting or conference, and
      wherein a point of contact is not available when the directory services attributes indicate the current status of the point of contact is out of the office or in a meeting or conference;
   when querying the directory services attributes determines the point of contact is available, repeatedly transmitting the information management system alert to the available point of contact within a predetermined period of time until an acknowledgment is received from the available point of contact; and
   when an acknowledgment is not received from the available point of contact within the predetermined period of time, transmitting the information management system alert to another point of contact on one or more lists or hierarchies of points of contact for the information management system.

2. The method of claim 1, wherein determining the availability of the point of contact includes:
   determining a location of the point of contact; and
   determining that the point of contact is unavailable if the location of the point of contact exceeds a predetermined distance from a premises of an organization for which the information management system is implemented.

3. The method of claim 1, wherein the information management system alert is acknowledged when the point of contact logs into a web-based user interface and indicates receipt of the information management system alert,
   wherein the web-based user interface is communicatively coupled to information management system.

4. The method of claim 1, wherein the lists or hierarchies of points of contact include supervisors of the point of contact.

5. The method of claim 1, further comprising:
   scheduling information management policy tasks for a client computing device,
      wherein scheduling the information management policy tasks includes populating a first queue with information management policy tasks, based on an information management policy, to be performed by the client computing device using one or more information management system processes or operations, wherein the information management policy defines a data storage policy related to creating secondary copies of data from primary copies of data; and scheduling information management system tasks for the client computing device, wherein scheduling the information management system includes populating a second queue with the information management system tasks, wherein the information management system tasks are tasks to be performed by the client computing device that are not defined by the information management policy and that are not executed by the information management processes or operations.

6. At least one non-transitory, computer-readable medium carrying instructions, which when executed by at least one data processing device, escalates an information management system alert for an information management system, comprising:

receiving an indication of an information management system operation failure;

determining parameters of the information management system operation failure, wherein determining the parameters includes receiving:
a type of information management system operation to be performed between a first computing device and a second computing device,
a schedule time window for completion of the information management system operation, and
a throughput estimation technique;

estimating throughput between the first computing device and the second computing device,
wherein throughput is a rate of transferring data per unit time between a storage device for the first computing device and a storage device for the second computing device, determining whether an information management system operation is completable within the schedule time window, including:
estimating a size of data to be transferred between the first computing device and the second computing device to execute the received type of information management system operation,
estimating a duration for the type of information management system operation based on the estimated size of data to be transferred and based on the estimated throughput between the first computing device and the second computing device, and
comparing a duration of the schedule time window with the estimated duration for the type of information management system operation; and providing an information management system alert if the estimated duration for the type of information management system operation is greater than the duration of the schedule time window;

determining whether a point of contact is available to address the information management system alert by querying directory services attributes for the point of contact, including querying, via an application programming interface (API) of a directory services application, the directory services attributes for a current status of the point of contact,
wherein the directory services attributes are configured by an administrator and define conditions that constitute the current status of the point of contact as being available to address the information management system alert;

when querying the directory services attributes determines the point of contact is available, repeatedly transmitting the information management system alert to the available point of contact within a predetermined period of time until an acknowledgment is received from the available point of contact; and when an acknowledgment is not received from the available point of contact within the predetermined period of time, transmitting the information management system alert to another point of contact on one or more lists or hierarchies of points of contact for the information management system.

7. The non-transitory, computer-readable medium of claim 6, wherein determining the availability of the point of contact includes:
determining a location of the point of contact; and
determining that the point of contact is unavailable if the location of the point of contact exceeds a predetermined distance from a premises of an organization for which the information management system is implemented.

8. The non-transitory, computer-readable medium of claim 6, wherein determining whether the point of contact is available to address the information management system alert includes:
determining that the point of contact is unavailable when the current status of the point of contact indicates that the point of contact is in a meeting, out of the office, or on a telephone call.

9. The non-transitory, computer-readable medium of claim 6, wherein the information management system alert is acknowledged when the point of contact logs into a web-based user interface and indicates receipt of the information management system alert,
wherein the web-based user interface is communicatively coupled to information management system.

10. The non-transitory, computer-readable medium of claim 6, wherein the lists or hierarchies of points of contact include supervisors of the point of contact.

11. A system for escalating an information management system alert for an information management system, the system comprising:
at least one processor;
means for receiving an indication of an information management system operation failure;
means for determining parameters of the information management system operation failure,
wherein determining the parameters includes receiving:
a type of information management system operation to be performed between a first computing device and a second computing device,
a schedule time window for completion of the information management system operation, and
a throughput estimation technique;
means for estimating throughput between the first computing device and the second computing device,
wherein throughput is a rate of transferring data per unit time between a storage device for the first computing device and a storage device for the second computing device,
means for determining whether an information management system operation is completable within the schedule time window, including:
estimating a size of data to be transferred between the first computing device and the second computing device to execute the received type of information management system operation, estimating a duration for the type of information management system operation based on the estimated size of data to be transferred and based on the estimated throughput between the first computing device and the second computing device, and comparing a duration of the schedule time window with the estimated duration for the type of information management system operation; and means for providing an information management system alert if the estimated duration for the type of information management system operation is greater than the duration of the schedule time window;

means for determining whether a point of contact is available to address the information management system alert by:

querying directory services attributes for an availability status of the point of contact;

determining a location of the point of contact; and determining that the point of contact is available when the location of the point of contact is within a predetermined distance from a premises of an organization for which the information management system is implemented;

when querying the directory services attributes determines the point of contact is available; means for repeatedly transmitting the information management system alert to the point of contact within a predetermined period of time until an acknowledgment is received from the available point of contact when querying the directory services attributes determines the point of contact is available; and means for transmitting the information management system alert to another point of contact on one or more lists or hierarchies of points of contact for the information management system when an acknowledgment is not received from the available point of contact within the predetermined period of time.

12. The system of claim 11, wherein the means for determining whether the point of contact is available to address the information management system alert includes:

means for querying an application programming interface (API) of a directory services application for a status of the point of contact; and means for determining that the point of contact is unavailable when the status of the point of contact indicates that the point of contact is in a meeting, out of the office, or on a telephone call.

13. The system of claim 11, wherein the information management system alert is acknowledged when the point of contact logs into a web-based user interface and indicates receipt of the information management system alert, wherein the web-based user interface is communicatively coupled to information management system.

14. The system of claim 11, wherein the lists or hierarchies of points of contact include supervisors of the point of contact.

15. The system of claim 11, wherein determining that the point of contact is available when the location of the point of contact is within a predetermined distance from a premises of an organization for which the information management system is implemented includes:

acquiring a location of a communication device associated with the point of contact; and updating, via web-based services, directory services attributes for the point of contact with the acquired location of the communication device.

\* \* \* \* \*